United States Patent
Gu et al.

(10) Patent No.: US 10,129,542 B2
(45) Date of Patent: Nov. 13, 2018

(54) REFERENCE PIXEL SELECTION AND FILTERING FOR INTRA CODING OF DEPTH MAP

(71) Applicant: Futurewei Technologies, Inc., Plano, TX (US)

(72) Inventors: Zhouye Gu, Santa Clara, CA (US); Jianhua Zheng, Beijing (CN); Nam Ling, San Jose, CA (US); Philipp Zhang, Plano, TX (US)

(73) Assignees: Futurewei Technologies, Inc., Plano, TX (US); Santa Clara University, Santa Clara, CA (US)

( * ) Notice: Subject to any disclaimer, the term of this patent is extended or adjusted under 35 U.S.C. 154(b) by 146 days.

(21) Appl. No.: 14/515,930

(22) Filed: Oct. 16, 2014

(65) Prior Publication Data

US 2015/0110174 A1    Apr. 23, 2015

Related U.S. Application Data

(60) Provisional application No. 61/892,342, filed on Oct. 17, 2013, provisional application No. 61/923,124, filed on Jan. 2, 2014.

(51) Int. Cl.

| | |
|---|---|
| *H04N 19/105* | (2014.01) |
| *H04N 19/159* | (2014.01) |
| *H04N 19/176* | (2014.01) |
| *H04N 19/117* | (2014.01) |
| *H04N 19/157* | (2014.01) |
| *H04N 19/182* | (2014.01) |
| *H04N 19/597* | (2014.01) |

(Continued)

(52) U.S. Cl.
CPC ......... *H04N 19/105* (2014.11); *H04N 19/117* (2014.11); *H04N 19/136* (2014.11); *H04N 19/157* (2014.11); *H04N 19/159* (2014.11); *H04N 19/176* (2014.11); *H04N 19/182* (2014.11); *H04N 19/597* (2014.11); *H04N 19/61* (2014.11)

(58) Field of Classification Search
CPC .. H04N 19/105; H04N 19/117; H04N 19/136; H04N 19/157; H04N 19/159; H04N 19/176; H04N 19/182; H04N 19/597; H04N 19/61
USPC .......................... 375/240.02, 240.12, 240.03
See application file for complete search history.

(56) References Cited

U.S. PATENT DOCUMENTS

| | | | |
|---|---|---|---|
| 8,798,146 B2 * | 8/2014 | Lim .................. | G06K 9/36 375/240.12 |
| 2010/0232505 A1 * | 9/2010 | Thoreau .............. | H04N 19/105 375/240.16 |

(Continued)

OTHER PUBLICATIONS

Zheng et al., Simplified Intra Smoothing, 2010, JCT-VC, pp. 1-4.*

(Continued)

*Primary Examiner* — Christopher S Kelley
*Assistant Examiner* — Kathleen M Walsh
(74) *Attorney, Agent, or Firm* — Conley Rose, P.C.

(57) ABSTRACT

A video codec configured to receive a current block and a plurality of neighboring pixels, wherein the current block comprises a first partition and a second partition, select one or more reference pixels from the plurality of neighboring pixels, and predict a plurality of pixels located in the second partition based on the reference pixels.

14 Claims, 17 Drawing Sheets

(51) Int. Cl.
*H04N 19/136* (2014.01)
*H04N 19/61* (2014.01)

(56) References Cited

U.S. PATENT DOCUMENTS

| | | | | |
|---|---|---|---|---|
| 2011/0280304 | A1* | 11/2011 | Jeon | H04N 19/105 375/240.12 |
| 2011/0293001 | A1* | 12/2011 | Lim | G06K 9/36 375/240.12 |
| 2012/0008676 | A1* | 1/2012 | Lee | H04N 19/137 375/240.02 |
| 2012/0236936 | A1* | 9/2012 | Segall | H04N 19/105 375/240.08 |
| 2013/0094580 | A1* | 4/2013 | Zhou | H04N 19/13 375/240.12 |
| 2013/0329794 | A1* | 12/2013 | Jeon | H04N 19/61 375/240.12 |
| 2014/0056352 | A1* | 2/2014 | Park | H04N 19/117 375/240.12 |
| 2014/0105290 | A1* | 4/2014 | Kwon | H04N 19/50 375/240.12 |
| 2014/0294061 | A1* | 10/2014 | Zhang | H04N 19/00042 375/240.02 |
| 2014/0301454 | A1* | 10/2014 | Zhang | H04N 13/0048 375/240.12 |
| 2014/0307786 | A1* | 10/2014 | Deng | H04N 13/0007 375/240.12 |
| 2015/0003512 | A1* | 1/2015 | Deng | H04N 19/187 375/240.02 |
| 2015/0172717 | A1* | 6/2015 | Zhao | H04N 19/597 375/240.16 |
| 2015/0245061 | A1* | 8/2015 | Chen | H04N 19/597 375/240.13 |
| 2015/0350677 | A1* | 12/2015 | Lim | H04N 19/463 375/240.12 |
| 2016/0029038 | A1* | 1/2016 | Zhao | H04N 19/119 375/240.12 |
| 2016/0050419 | A1* | 2/2016 | Zhao | H04N 19/597 375/240.12 |

OTHER PUBLICATIONS

Dai et al., Geometry-Adaptive Block Partitioning for Intra Prediction in Image & Video Coding, 2007, IEEE, pp. 85-88.*

Zhao, X., et al., "JCT3V-D0183: CE6.h related: Simplified DC predictor for depth intra modes," Motion Picture Expert Group or ISO/IEC JTC1/SC29/WG11, No. m29014, Apr. 21, 2013, 8 pages.

Gu, Z., et al., "3D-CE5 related: On neighbouring reference pixel selection for depth intra coding," Joint Collaborative Team on 3D Video Coding Extension Development of ITU-T SG 16 WP 3 and ISO/IEC JTC 1/SC 29/WG 11, JCT3V-G0143, Jan. 9-17, 2014, 6 pages.

Li, G., et al., "Simplification of mode dependent intra smoothing," Joint Collaborative Team on Video Coding (JCT-VC) of ITU-T SG16 WP3 and ISO/IEC JTC1/SC29/WG11, JCTVC-H0465, Feb. 1-10, 2012, 3 pages.

Zheng, Y., et al., "Simplified Intra Smoothing," Joint Collaborative Team on Video Coding (JCT-VC) of ITU-T SG16 WP3 and ISO/IEC JTC1/SC29/WG11, JCTVC-C234, m18274, Oct. 7-15, 2010, 4 pages.

Congxia, D., et al., "Geometry-Adaptive Block Partitioning for Intra Prediction in Image & Video Coding," International Conference on Image Processing, Sep. 2007, pp. 85-88.

Foreign Communication From a Counterpart Application, PCT Application No. PCT/US2014/060873, International Search Report dated Mar. 10, 2015, 6 pages.

Foreign Communication From a Counterpart Application, PCT Application No. PCT/US2014/060873, Written Opinion dated Mar. 10, 2015, 10 pages.

Tech, G., et al., "3D-HEVC Test Model 2," Joint Collaborative Team on 3D Video Coding Extension Development of ITU-T SG 16 WP 3 and ISO/IEC JTC 1/SC 29/WG 11, B1005_d0, Oct. 13-19, 2012, 118 pages.

Zhang, L., et al., "3D-HEVC Test Model Description," Joint Collaborative Team on 3D Video Coding Extension Development of ITU-T SG 16 WP 3 and ISO/IEC JTC 1/SC 29/WG 11, Jul. 27-Aug. 2, 2013, JCT3V-E1005, 57 pages.

Tech, G., et al., "3D-HEVC Draft Text 5," Joint Collaborative Team on 3D Video Coding Extensions of ITU-T SG 16 WP 3 and ISO/IEC JTC 1/SC 29/WG 11, JCT3V-I1001-v3, Jul. 3-9, 2014, 94 pages.

Bross, B., et al., "High Efficiency Video Coding (HEVC) text specification draft 10 (for FDIS & Last Call)," Joint Collaborative Team on Video Coding (JCT-VC) of ITU-T SG 16 WP 3 and ISO/IEC JTC 1/SC 29/WG 11, JCTVC-L1003_v34, Jan. 14-23, 2013, 310 pages.

* cited by examiner

500

|     |     |     |     |
|-----|-----|-----|-----|
| P₀  | P₀  | P₀  | P₀  |
| P₀  | P₀  | P₀  | P₁  |
| P₀  | P₀  | P₁  | P₁  |
| P₀  | P₁  | P₁  | P₁  |

|     |     |     |     |
|-----|-----|-----|-----|
| P₀  | P₀  | P₁  | P₁  |
| P₀  | P₀  | P₁  | P₁  |
| P₁  | P₁  | P₁  | P₁  |
| P₁  | P₁  | P₁  | P₁  |

|  | video 0 | video 1 | video 2 | video PSNR / video bitrate | video PSNR / total bitrate | synth PSNR / total bitrate | enc time | dec time | ren time |
| --- | --- | --- | --- | --- | --- | --- | --- | --- | --- |
| Balloons | 0.00% | 0.00% | 0.00% | 0.00% | -0.02% | -0.03% | 99.7% | 103.9% | 100.3% |
| Kendo | 0.00% | 0.00% | 0.00% | 0.00% | -0.01% | -0.06% | 100.3% | 106.1% | 101.3% |
| Newspaper_CC | 0.00% | 0.00% | 0.00% | 0.00% | -0.01% | -0.11% | 99.5% | 101.7% | 104.6% |
| GT_Fly | 0.00% | 0.00% | 0.00% | 0.00% | -0.05% | -0.16% | 100.0% | 90.7% | 97.0% |
| Poznan_Hall2 | 0.00% | 0.00% | 0.00% | 0.00% | -0.02% | -0.07% | 99.8% | 97.0% | 96.9% |
| Poznan_Street | 0.00% | 0.00% | 0.00% | 0.00% | -0.02% | -0.10% | 99.5% | 98.0% | 101.3% |
| Undo_Dancer | 0.00% | 0.00% | 0.00% | 0.00% | -0.03% | -0.03% | 99.4% | 104.4% | 100.0% |
| Shark | 0.00% | 0.00% | 0.00% | 0.00% | -0.11% | -0.26% | 99.6% | 93.8% | 99.7% |
| 1024x768 | 0.00% | 0.00% | 0.00% | 0.00% | -0.01% | -0.07% | 99.8% | 103.9% | 102.1% |
| 1920x1088 | 0.00% | 0.00% | 0.00% | 0.00% | -0.04% | -0.12% | 99.7% | 96.8% | 99.0% |
| average | 0.00% | 0.00% | 0.00% | 0.00% | -0.03% | -0.10% | 99.7% | 99.4% | 100.1% |

*FIG. 9A*

|  | video 0 | video 1 | video 2 | video PSNR / video bitrate | video PSNR / total bitrate | synth PSNR / total bitrate | enc time | dec time | ren time |
|---|---|---|---|---|---|---|---|---|---|
| Balloons | 0.00% | -0.12% | -0.11% | -0.03% | -0.05% | -0.05% | 99.4% | 97.6% | 100.9% |
| Kendo | 0.00% | -0.23% | -0.13% | -0.07% | -0.04% | -0.08% | 99.6% | 111.6% | 100.7% |
| Newspaper_CC | 0.00% | -0.15% | -0.09% | -0.05% | -0.08% | -0.15% | 99.9% | 104.4% | 100.3% |
| GT_Fly | 0.00% | -0.04% | -0.15% | -0.01% | -0.07% | -0.14% | 99.4% | 104.9% | 98.0% |
| Poznan_Hall2 | 0.00% | 0.04% | -0.11% | 0.00% | -0.08% | -0.07% | 100.5% | 107.4% | 100.0% |
| Poznan_Street | 0.00% | -0.24% | 0.01% | -0.03% | -0.04% | -0.07% | 99.6% | 106.4% | 98.8% |
| Undo_Dancer | 0.00% | -0.04% | -0.03% | -0.01% | -0.03% | -0.09% | 99.8% | 100.5% | 98.6% |
| Shark | 0.00% | -0.06% | -0.05% | -0.01% | -0.05% | -0.02% | 99.7% | 102.8% | 99.7% |
| 1024x768 | 0.00% | -0.17% | -0.11% | -0.05% | -0.06% | -0.09% | 99.7% | 104.5% | 100.6% |
| 1920x1088 | 0.00% | -0.07% | -0.07% | -0.01% | -0.05% | -0.08% | 99.8% | 104.4% | 99.0% |
| average | 0.0% | -0.1% | -0.1% | 0.0% | -0.1% | -0.1% | 99.8% | 104.5% | 99.6% |

*FIG. 9B*

REFERENCE PIXEL SELECTION AND FILTERING FOR INTRA CODING OF DEPTH MAP

CROSS-REFERENCE TO RELATED APPLICATIONS

The present application claims benefit of U.S. Provisional Patent Application No. 61/892,342 filed Oct. 17, 2013 by Zhouye Gu et al. and entitled "Simplified DC Predictor for Depth Intra Modes," and U.S. Provisional Patent Application No. 61/923,124 filed Jan. 2, 2014 by Zhouye Gu et al. and entitled "On Neighboring Reference Pixel Selection for Depth Intra Coding," both of which are incorporated herein by reference as if reproduced in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and many more. Digital video devices implement various video compression techniques to transmit and receive digital video information more efficiently. Some of the video compression techniques have been described in standards including Moving Picture Experts Group (MPEG)-2, MPEG-4, the International Telecommunications Union (ITU) Telecommunications Standardization Sector (ITU-T) H.263, ITU-T H.264/MPEG-4, Part 10, Advanced Video Coding (AVC), and extensions of such standards, all of which are incorporated by reference. New video standards continue to emerge and evolve. For example, the High Efficiency Video Coding (HEVC) standard, sometimes referred to as H.265, is currently being developed by the Joint Collaborative Team-Video Coding (JCT-VC) as a collaborative effort by MPEG and ITU-T.

SUMMARY

In one embodiment, the disclosure includes a video codec configured to receive a current block and a plurality of neighboring pixels, wherein the current block comprises a first partition and a second partition, select one or more reference pixels from the plurality of neighboring pixels, and predict a plurality of pixels located in the second partition based on the reference pixels.

In another embodiment, the disclosure includes an apparatus, used in video encoding, comprising a processor configured to receive a current block comprising a first partition and a second partition, wherein the first partition comprises at least top-right, top-left, and bottom-left corner samples of the current block, select a reference sample from an upper-right neighboring block of the current block and a lower-left neighboring block of the current block, and predict samples located in the second partition using the reference sample selected from the upper-right neighboring block and the lower-left neighboring block.

In yet another embodiment, the disclosure includes a method of intra prediction in Three-Dimensional-HEVC (3D-HEVC), the method comprising receiving a plurality of neighboring samples with respect to a current block, wherein the neighboring samples comprise a first sample located at a bottom-right corner of a lower-left neighboring block and a second sample located at a bottom-right corner of an upper-right neighboring block, receiving a partition pattern that specifies a partitioning of the current block into partition 0 and partition 1, wherein the partition 0 comprises at least top-right, top-left, and bottom-left corner samples of the current block, and selecting one of the first sample and the second sample as a reference sample for intra predicting the partition 1.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 5A and 5B are schematic diagrams showing an examplary Wedgelet partition and an examplary Contour partition, respectively.

FIGS. 8A and 8B are schematic diagrams showing additional embodiments of reference sample selection schemes.

FIGS. 9A and 9B show simulation results obtained by using reference sample selection and filtering techniques.

DETAILED DESCRIPTION

Figure 1:
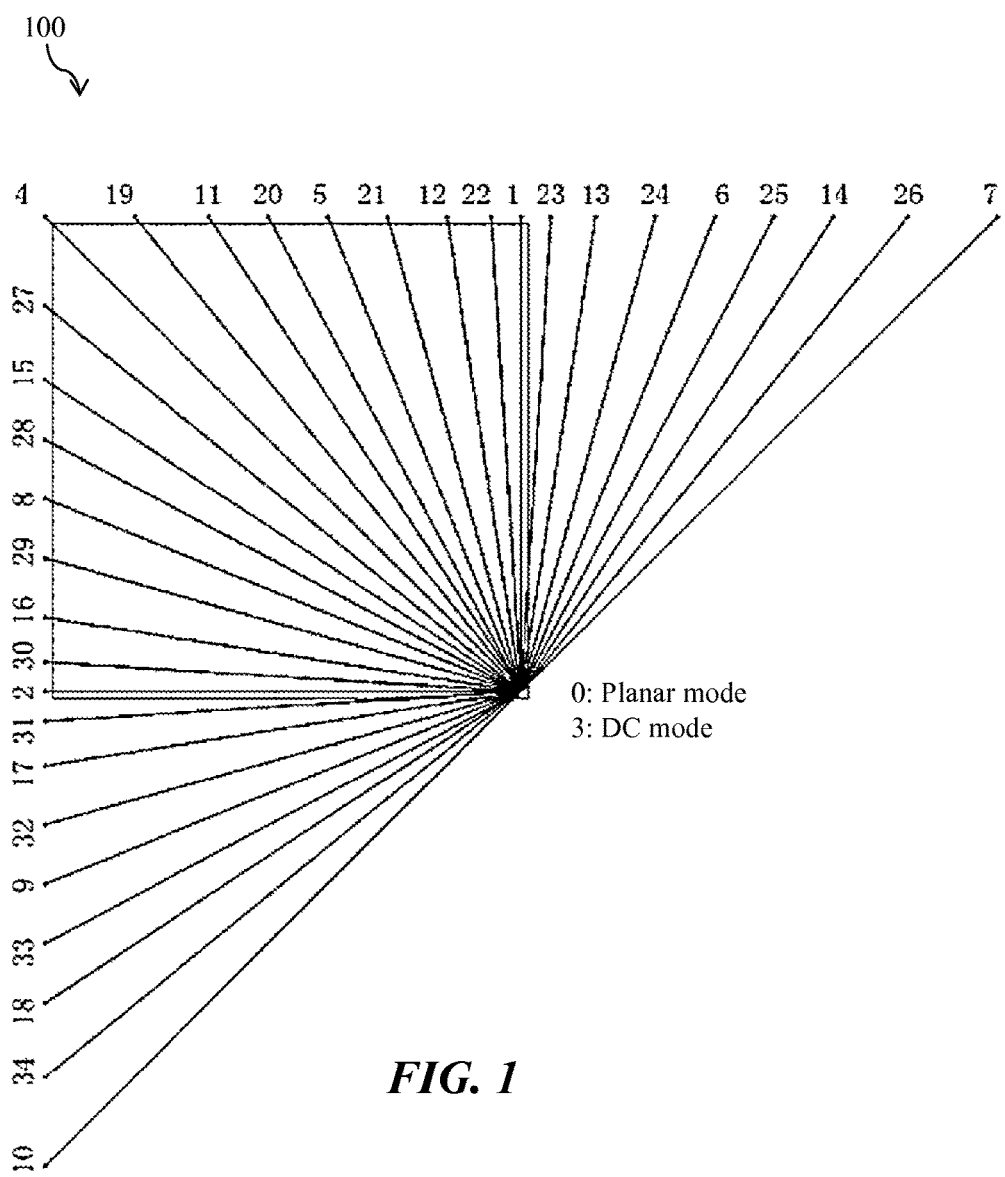
FIG. 1 is a schematic diagram of an intra prediction scheme, which shows thirty-five intra prediction modes that are allowed in the HEVC software model (HM).

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video compression techniques perform spatial prediction and/or temporal prediction to reduce or remove redundancy that is inherent in video sequences. For block-based video coding, a video frame or slice is divided or partitioned into blocks referred to as macroblocks or coding units (CUs). A CU of the HEVC standard has a similar purpose to a macroblock of the H.264 standard, except that a CU may not have a size distinction. CUs in an intra-coded frame or slice (known as an intra (I)-frame) may be encoded using spatial prediction with respect to neighboring CUs in the same frame or slice. CUs in an inter-coded frame or slice (known as a predicted (P)-frame or a bi-predicted (B)-frame) may either use spatial prediction with respect to neighboring CUs in the same frame or slice, or use temporal prediction with respect to other reference frames.

Disclosed herein are reference sample selection and filtering techniques to improve intra prediction quality during the compression or encoding of a depth map frame. In 3D-HEVC, a block currently being encoded (i.e., a current block) may be partitioned into two regions or partitions in certain intra prediction modes. Embodiments disclosed herein select one or more reference samples for intra prediction based on how the two regions are partitioned. For instance, if a first partition occupies top-right, top-left, and bottom-left corner samples of the current block (such pattern is sometimes referred a Case 1), the reference sample for predicting a second partition is then either a first sample located at a bottom-right corner of a lower-left neighboring block or a second sample located at a bottom-right corner of the upper-right neighboring block. Further, absolute differences between certain neighboring samples are calculated and compared to finalize which reference sample to use as a mean value (sometimes referred to as direct current (DC) value) of the second partition. In other embodiments disclosed herein, multiple reference samples may be filtered before intra prediction, and decisions of whether to filter reference samples depend on various factors such as an intra prediction mode, a size of the current block, and a signaling flag.

On a broader scope, the present disclosure looks into issues challenging HEVC after the committee draft (CD). Such issues include depth modelling mode (DMM), depth lookup table (DLT), prediction mode selection, view synthesis optimization, and/or HEVC extension. The present disclosure also looks into ways to improve these coding techniques by examining trade-offs between coding gain and computational complexity. The disclosed intra prediction embodiments have been tested to measure Bjontegaard Delta (BD)-rate performances. Simulation results demonstrate that the disclosed DC prediction techniques improve coding efficiency both in the 3D-HEVC random access (under common test condition (CTC)) and in an All-Intra configuration.

An image or video frame may comprise a large amount of samples or pixels (e.g., 2,073,600 pixels in a 1920×1080 frame). Thus, independently encoding and decoding (generally referred to hereinafter as coding) each pixel may be cumbersome and inefficient. To improve coding efficiency, a video frame is broken into rectangular blocks, which may serve as basic units of processing such as coding, prediction, transform, and quantization. For example, a typical N×N block may comprise $N^2$ pixels, where N is an integer greater than one and is often a multiple of four. Compared to macroblocks used in previous coding standards, new block concepts have been introduced in HEVC. For example, coding unit (CU) refers to a sub-partitioning of a video frame into rectangular blocks of equal or variable size. Depending on a mode of inter- or intra prediction, a CU comprises one or more prediction units (PUs), each of which serves as a basic unit of prediction. For example, a 64×64 CU may be symmetrically split into four 32×32 PUs for intra prediction. For another example, a 64×64 CU may be asymmetrically split into a 16×64 PU and a 48×64 PU for inter prediction. Similarly, a PU may comprise one or more transform units (TUs), each of which serves as a basic unit for transform and/or quantization. For example, a 32×32 PU may be symmetrically split into four 16×16 TUs. Multiple TUs of one PU may share a same prediction mode, but may be transformed separately. Herein, the term block can generally refer to any of a macroblock, CU, PU, or TU depending on the context.

Blocks are encoded using inter-predictive coding or intra-predictive coding. In intra prediction, a current block (e.g., a PU currently being coded) may be predicted using a neighboring block in the same frame if the neighboring block has already been encoded. Typically, blocks of a frame are coded left-to-right, top-to-bottom, or in a zigzag-scan order. Therefore, the current block may be predicted using one or more reference samples, which may be located in a neighboring block anywhere above the current block or anywhere to the left of the current block. Block sizes in intra prediction coding vary widely, e.g., between a relatively small size (e.g., 4×4) and a relatively large size (e.g., 128×128). An intra prediction direction (i.e., the direction from an already-encoded block to the current block) determines the intra prediction mode.

FIG. 1 illustrates an intra prediction scheme 100, which shows thirty-five intra prediction modes that are allowed in the HEVC software model (HM). The thirty-five modes include thirty-three different intra prediction directional modes, one planar mode, and one DC mode. As shown in FIG. 1, each of the thirty-three of the intra prediction directional modes corresponds to an extrapolation direction that has an angle between about 45 and −135 degrees from the horizontal, going clockwise. The thirty-three directional modes spread for about 180 degrees (°) with an angular resolution close to about 5.625°. The angle indicates a direction of extrapolation from reference pixels to pixels of the current block. In the non-directional modes including Planar mode (denoted as mode 0) and DC mode (denoted as mode 1), a sampling of certain neighboring pixels may be used to predict the pixels of the current block. 3D-HEVC apply both conventional HEVC intra prediction modes and new DMM modes for the intra coding of a depth map. Specifically, 3D-HEVC utilizes various partition-based depth map coding methods including depth modeling mode (DMM), Segment-wise DC Coding (SDC) (previously referred to as Simplified Depth Coding, also known as SDC_DMM1), Region Boundary Chain mode (RBC), and Chain Coding. Neighboring reference pixels can be used in both conventional and new intra prediction modes.

During HEVC intra-predictive coding, various factors may affect and degrade prediction accuracy. For example, as the size of a PU increases, the prediction accuracy of pixels farther away from the predictor pixels may be degraded. Degradation of prediction accuracy may result in more residual data, which in turn produces more data to be encoded, transmitted, and/or stored. To improve prediction accuracy, a smoothing filter may be applied to reference pixels (predictor pixels) used to predict a block. In some cases, however, better results would be achieved without using any smoothing filter on the reference pixels. Current standards utilize adaptive intra smoothing techniques for texture frame coding.

In 3D-HEVC, the same adaptive intra smoothing techniques may be used for the intra coding of depth maps. Depth maps may be characterized by sharp edges, which represent object borders, and large areas of nearly constant or slowly varying sample values, which represent object areas. While HEVC intra prediction and transform coding techniques are well-suited for nearly constant regions, they may sometimes result in significant coding artifacts at sharp edges. The artifacts would be visible in synthesized intermediate views, therefore reducing video quality. For a better representation of edges in depth maps, four new intra prediction modes have been specifically designed for depth map intra coding. The four new modes are known as depth modelling modes (DMMs), or simply as DMM1 to DMM4. The DMMs may be integrated as an alternative to the conventional intra prediction modes specified in HEVC. With the DMMs, reference sample selection schemes used for texture frame coding may not always suit depth frame coding. It is desirable to development new reference pixel selection algorithm for depth map intra prediction. In the new depth intra prediction modes (e.g., DMM1-4), either filtered or non-filtered neighboring reference pixels can be used for intra prediction. Similar to the intra prediction modes, a residual representing the difference between the approximation and the original depth signal can be encoded via transform coding and then transmitted.

In all four DMM modes, a depth block is approximated by a model that partitions the area of the block into two parts, partitions, or regions, where each region, rectangular or non-rectangular, is represented by a constant value. Information for such a model comprises partition information specifying which region each sample belongs to and region value information specifying a constant value for the samples located in each corresponding region. The region value information is sometimes referred to herein as a constant partition value (CPV). Wedgelet partitioning and Contour partitioning are different ways of dividing a current block into two regions.

Figure 2A:
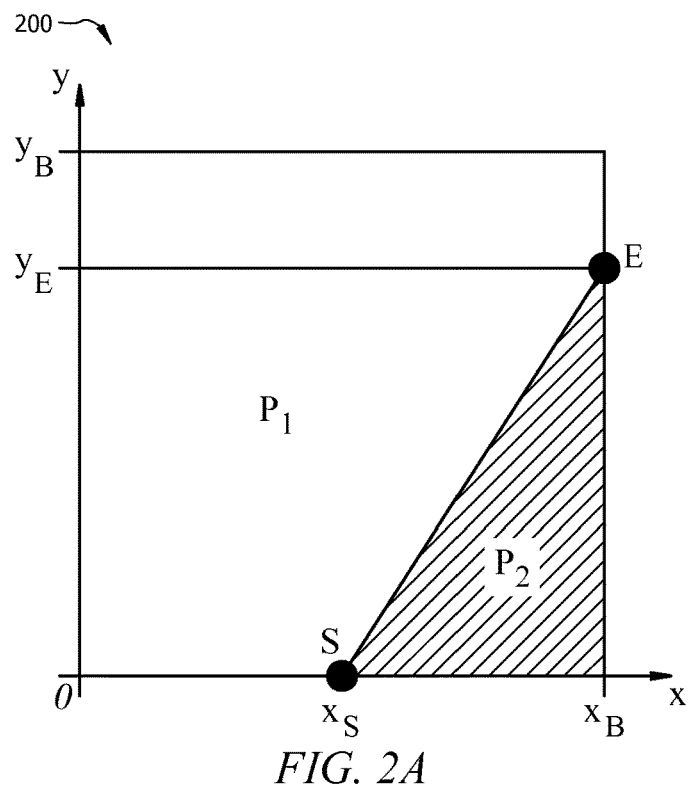
FIGS. 2A-2C are schematic diagrams showing an embodiment of a Wedgelet partitioning scheme.
Figure 2B:
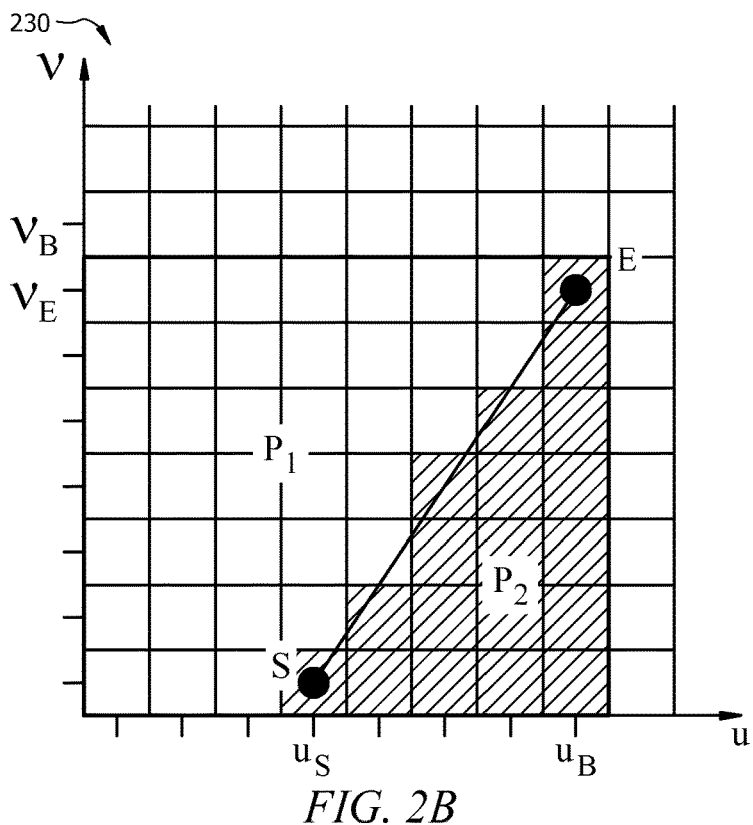
Figure 2C:
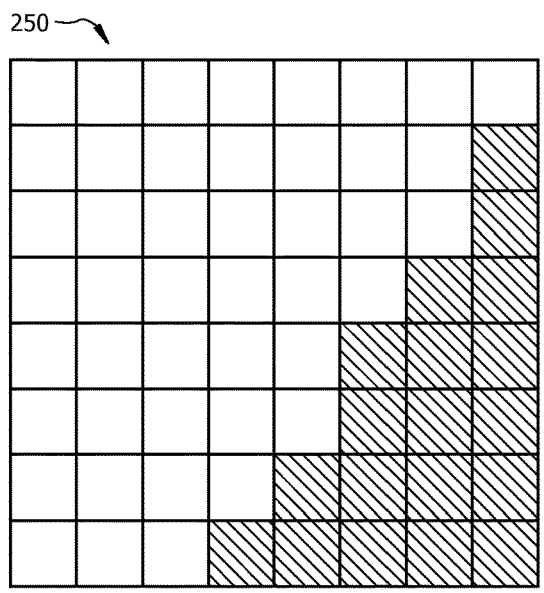

FIGS. 2A-2C illustrate an embodiment of a Wedgelet partitioning scheme, in which two regions are defined as separated by a straight line. The two regions are labelled as $P_1$ and $P_2$. The separation line is determined by a start point S and an end point E, where S and E are located on different borders of the current block. For a continuous signal space 200 shown in FIG. 2A, the separation line can be described by the equation of a straight line. FIG. 2B illustrates the partitioning in a discrete sample space 230. Here, the block comprises an array of samples with size $u_B \times v_B$, where $u_B$ represents a block width and $v_B$ represents a block height. A starting sample marked with S, an end sample marked with E, and a roughly straight line in between correspond to border samples. Although the separation line can be described by a line equation as well, the definition of regions $P_1$ and $P_2$ is different in the discrete sample space 230, since only complete samples can be assigned as part of either of the two regions. To employ Wedgelet block partitioning in the coding process, the partition information is stored in the form of partition patterns. Such a pattern comprises an array of size $u_B \times v_B$, where each element contains the binary information specifying whether a corresponding sample belongs to region $P_1$ or $P_2$. The regions $P_1$ and $P_2$ can be represented by black and white samples, respectively, in the block 250 shown in FIG. 2C. In an embodiment, white samples in region $P_1$ can be assigned a partition value of 1, and black samples in region $P_2$ can be assigned a partition value of 0, or vice versa.

Figure 3A:
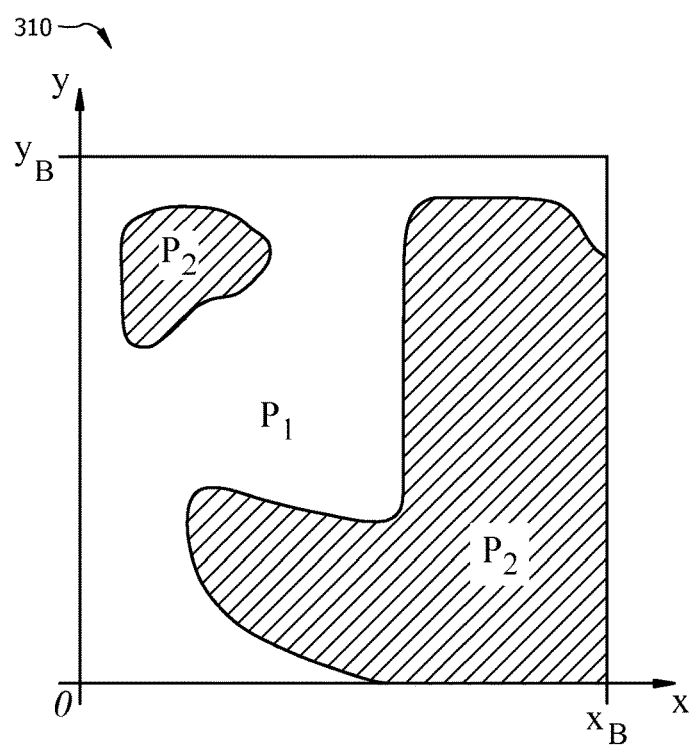
FIGS. 3A-3C are schematic diagrams showing an embodiment of a Contour partitioning scheme.
Figure 3B:
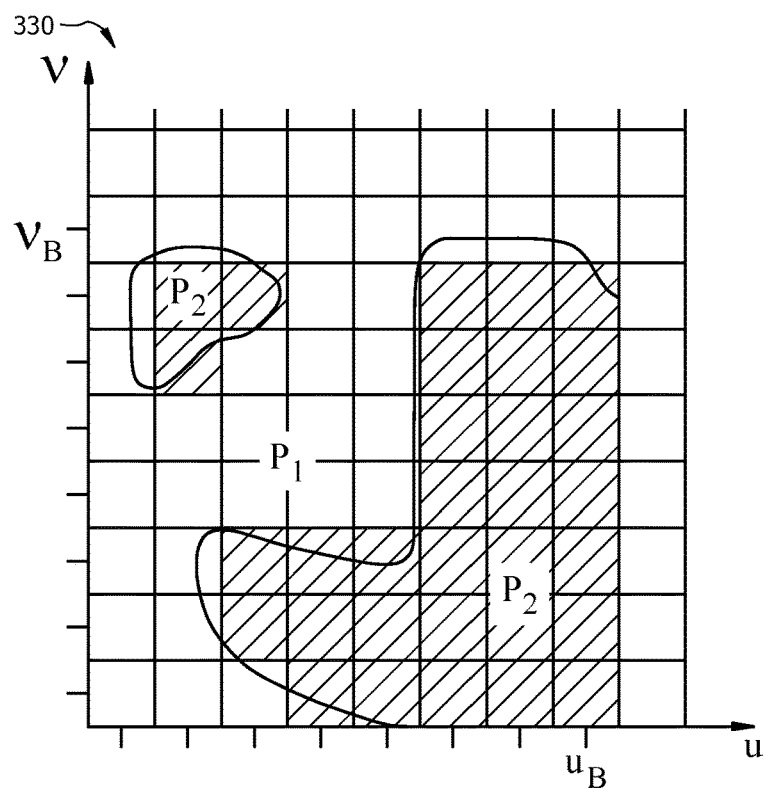
Figure 3C:
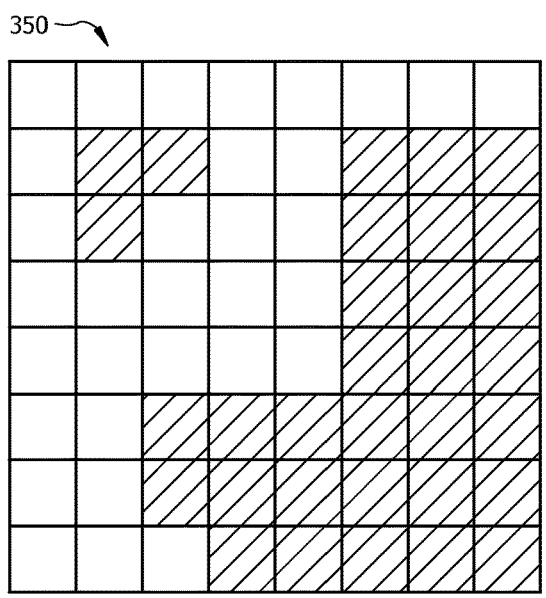

FIGS. 3A-3C illustrate an embodiment of a Contour partitioning scheme. Two regions are separated by an irregular line that cannot be easily described by a geometrical function. Specifically, FIG. 3A illustrates a continuous signal space 310, in which two regions $P_1$ and $P_2$ can be arbitrary shaped. FIG. 3B illustrates the conversion from the continuous signal space 310 to a discrete signal space 330. FIG. 3C illustrates a partition pattern for a block 350, wherein the binary information is represented by white and black samples. A region, such as $P_2$, may even comprise multiple disconnected parts. Apart from the partitioning pattern, the properties of Contour and Wedgelet partitions are very similar. To employ Contour partitions in the coding process, the partition pattern (e.g., as shown in FIG. 3C) is derived individually for each block from the signal of a reference block. In Contour partitioning, due to the lack of a functional description of the region separation line, no pattern lookup lists and consequently no search of the best matching partition are used.

Figure 4A:
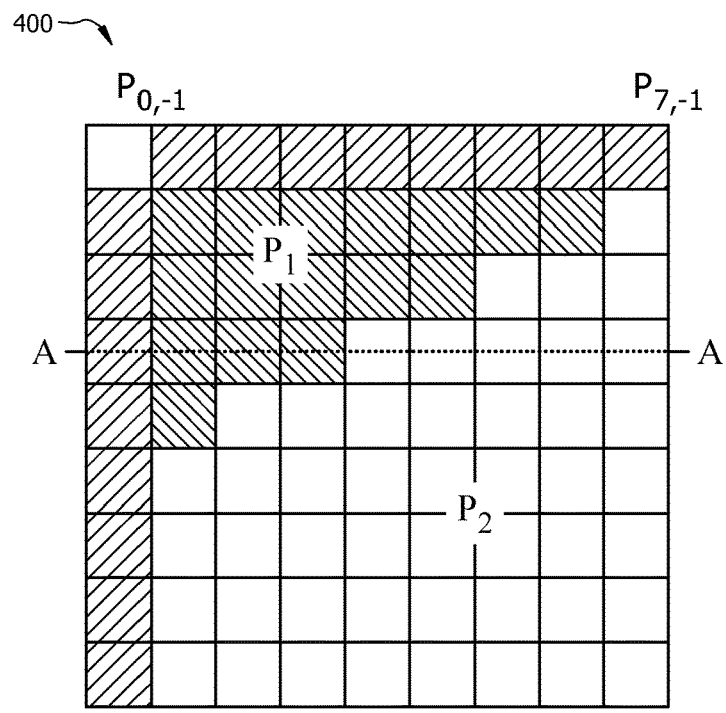
FIG. 4A is a schematic diagram of a block being partitioned into two regions $P_1$ and $P_2$.
Figure 4B:
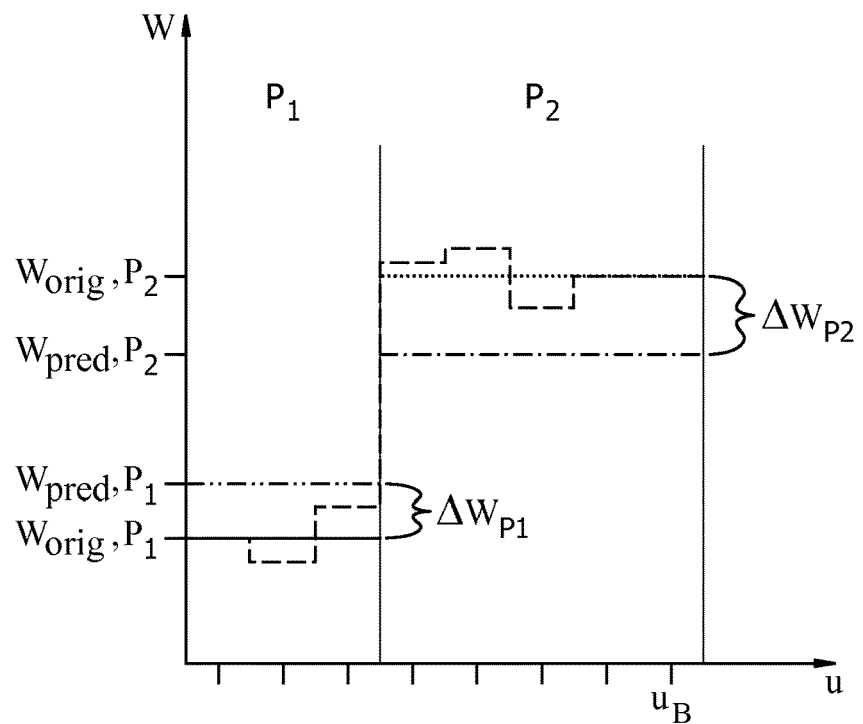
FIG. 4B is a schematic diagram showing three types of constant partition values (CPVs) generated for FIG. 4A.

FIG. 4A illustrates a block 400 partitioned into two regions $P_1$ and $P_2$. FIG. 4B illustrates three types of CPVs, including original, predicted, and delta CPVs, along the dotted line A-A. Either in form of a Wedgelet or a Contour partition, the second information required for modelling the signal of a depth block is the CPV of each of the two regions. The method for CPV coding is the same for all four modes introduced above, as it does not distinguish between partition types, but rather assumes that a partition pattern is given for the current depth block. FIG. 4B schematically shows that original CPVs are calculated as the mean value of samples covered by a corresponding region. Although the original CPVs lead to the best approximation for a given partition, they are not available at a decoder because original samples are not transmitted to the decoder. On the other hand, predicted CPVs do not require original sample values at the decoder. Instead, the predicted CPVs are derived from information that is available at the decoder. Such information includes adjacent samples located in a left neighboring block and/or a top neighboring block. For example, FIG. 4A shows that either a top reference sample row or a left reference sample column would comprise a first sample, a last sample, and a middle sample. In predicting a DC partition value, two of the three samples (from top row or left column) may be chosen to generate a DC predictor (the reference sample used as mean value of a partition) under different situations. Note that, each time, the DC predictor is calculated by up to two samples.

FIG. 5A illustrates an examplary Wedgelet partition 500 in which two parts, denoted as $P_0$ and $P_1$, are separated by a roughly straight line. FIG. 5B illustrates another examplary Contour partition 530 in which $P_0$ and $P_1$ parts are separated by a non-straight line. In 3D-HEVC, partition-based methods including DMM, SDC_DMM1 and Chain Coding are applied for depth map intra coding. With partition-based depth map intra coding methods, a depth block may be partitioned into two parts or regions. Each part, partition, or region in FIGS. 5A and 5B is represented by a single DC value (denotable as $DC_0$ or $DC_1$). The DC value of each partition is predicted using one or two reconstructed neighboring reference samples. Furthermore, the DC value for each partition ($P_0$ and $P_1$) can be further compensated by a delta DC/residual value. The residual value is explicitly signaled in the bitstream.

The choice of which reference samples to use for intra prediction may depend on partition patterns (e.g., location of the boundary line). FIGS. 6A-6D illustrate four different partition patterns 600, 630, 650, and 670, respectively. The partition patterns 600, 630, 650, and 670 are sometimes referred to as Case 1 to Case 4, respectively. The main difference among the four patterns or cases relates to partition values of three corner samples of a current block, including a top-left corner sample, a top-right corner sample, and a bottom-left corner sample. Specifically, in FIG. 6A, all corner samples 602, 604, and 606 are located in the same partition $P_0$. In FIG. 6B, corner sample 632 is located in partition $P_0$, while corner samples 634 and 636 are located in partition $P_1$. In FIG. 6C, corner samples 652 and 654 are located in partition $P_0$, while corner sample 656 is located in partition $P_1$. In FIG. 6D, corner samples 672 and 676 are located in partition $P_0$, while corner sample 674 is located in partition $P_1$. Although the current block may have any suitable size, as an example, FIGS. 6A-6D use a current block that has a size of 8×8 and sample values denoted by $C_{x,y}$, where $x=0 \ldots 7$ and $y=0 \ldots 7$.

In FIGS. 6A-6D, up to two reconstructed neighboring reference samples can be used to predict partitions $P_0$ and $P_1$. Generally, to optimize accuracy of depth map intra prediction, a reference sample or samples are selected to be as close as possible to as many of the partition samples as possible. Assume the reconstructed neighboring reference samples are denoted by $p_{i,j}$, where $i=-1, j=-1 \ldots 7$ and $i=0 \ldots 7, j=-1$. Further assume the partition value of a top-left corner sample ($c_{0,0}$) is X, where X=0 or 1, and assume a partition pattern $bPattern_{x,y}$, where $x=0 \ldots N-1$, $y=0 \ldots N-1$, and where N represents a size of the current block. Based on the forgoing assumptions, predicted DC values (e.g., $DC_0$ and $DC_1$) can be derived using the following operations:

Set $bT=(bPattern_{0,0}!=bPattern_{N-1,0})?1:0$; set $bL=(bPattern_{0,0}!=bPattern_{0,N-1})?1:0$ If bT equals bL $$DC_X=(p_{-1,0}+p_{0,-1})>>1 \quad (1)$$

$$DC_{1-X}=bL?(p_{-1,N-1}+p_{N-1,-1})>>1:2^{B-1} \quad (2)$$

Otherwise $$DC_X=bL?p_{(N-1)>>1,-1}:p_{-1,(N-1)>>1} \quad (3)$$

$$DC_{1-X}=bL?p_{-1,N-1}:p_{N-1,-1} \quad (4)$$

Figure 6A:
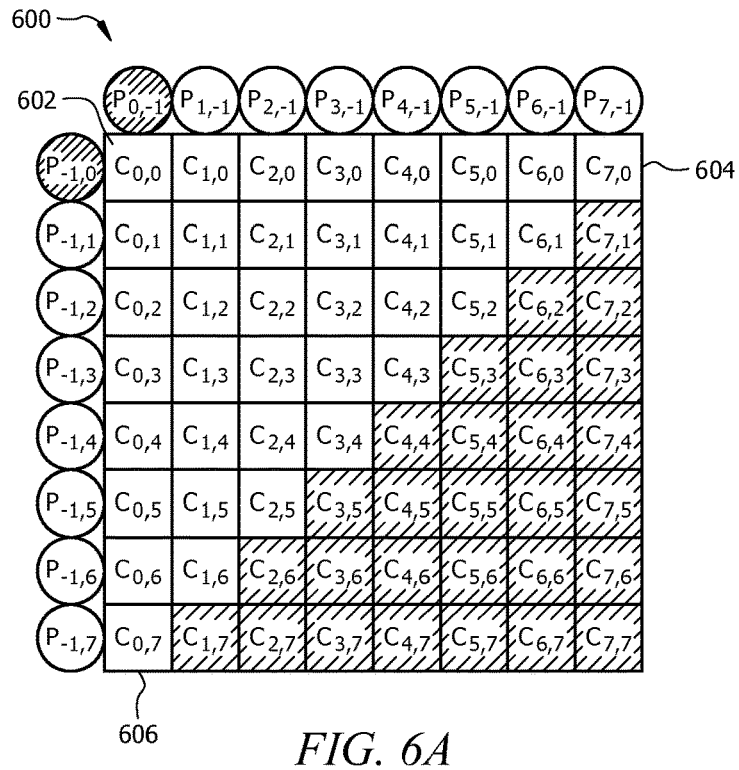
FIGS. 6A-6D are schematic diagrams showing four different partition patterns that are referred to as Case 1 to Case 4, respectively.
Figure 6B:
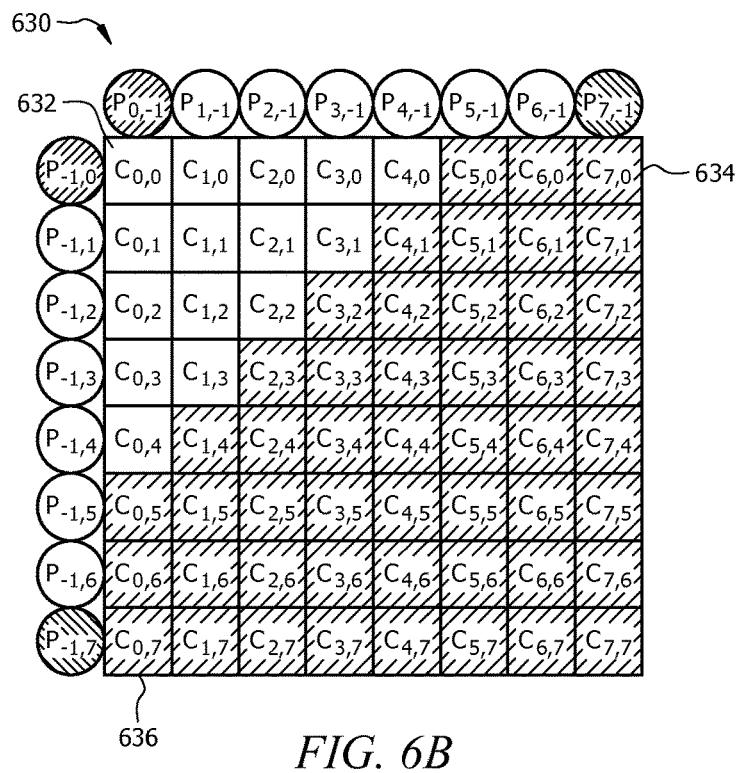
Figure 6C:
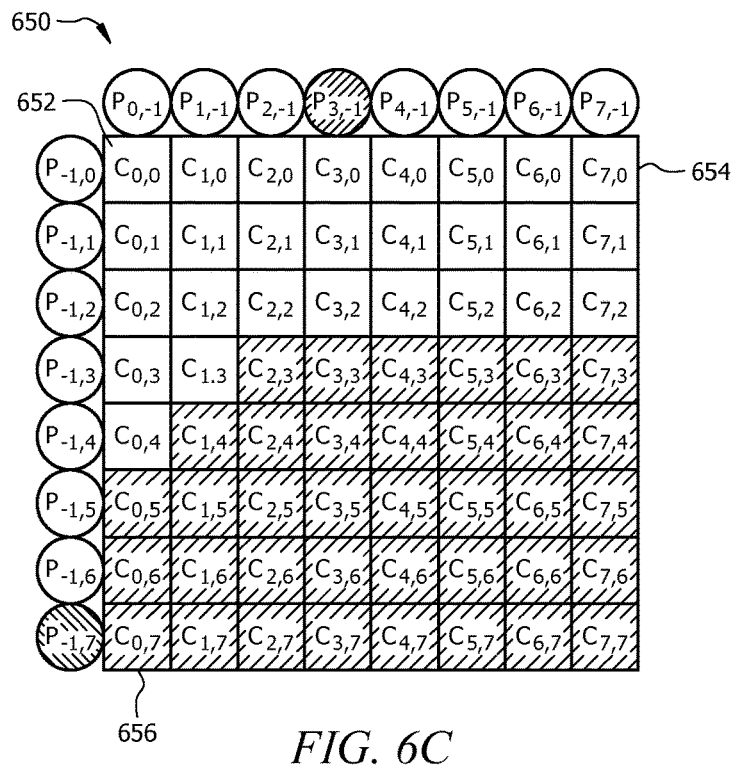
Figure 6D:
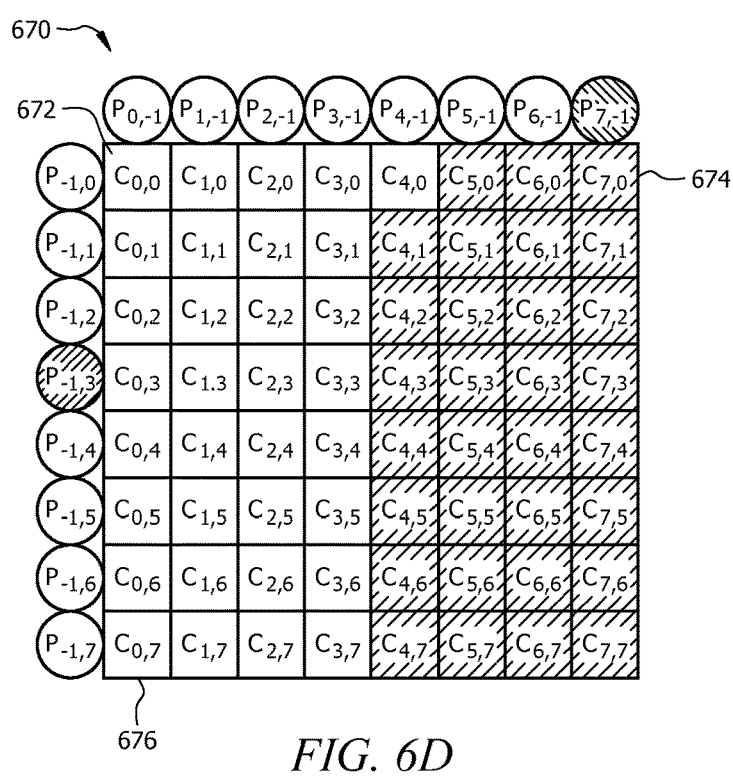

Based on the above-listed steps, one skilled in the art would understand that FIG. 6A uses reference samples $p_{-1,0}$ and $p_{0,-1}$ to predict partition $P_0$ (note the lack of reference sample for partition $P_1$). FIG. 6B uses reference samples $p_{-1,0}$ and $p_{0,-1}$ to predict partition $P_0$, and uses reference samples $p_{-1,7}$ and $p_{7,-1}$ to predict partition $P_1$. FIG. 6C uses reference sample $p_{3,-1}$ to predict partition $P_0$, and uses reference sample $p_{-1,7}$ to predict partition $P_1$. FIG. 6D uses reference sample $p_{-1,3}$ to predict partition $P_0$, and uses reference sample $p_{7,-1}$ to predict partition $P_1$. Referring back to FIG. 6A, since partition $P_1$ has no immediate neighboring samples, conventional methods predict partition $P_1$ using a pre-set DC value. Consequently, no neighboring reference sample is used in the intra prediction of partition $P_1$ of FIG. 6A. Embodiments disclosed herein solve this problem by expanding the choice of reference samples to reference pixels located in extended neighboring blocks (e.g., coding units). Briefly, in DC prediction of DMMs partitions or Regional Boundary Chain (RBC) partitions, reference pixels used to predict the DC values of each partition part can be selected from the extended pixels of left reference blocks or from the extended pixels of top reference blocks.

Figure 7A:
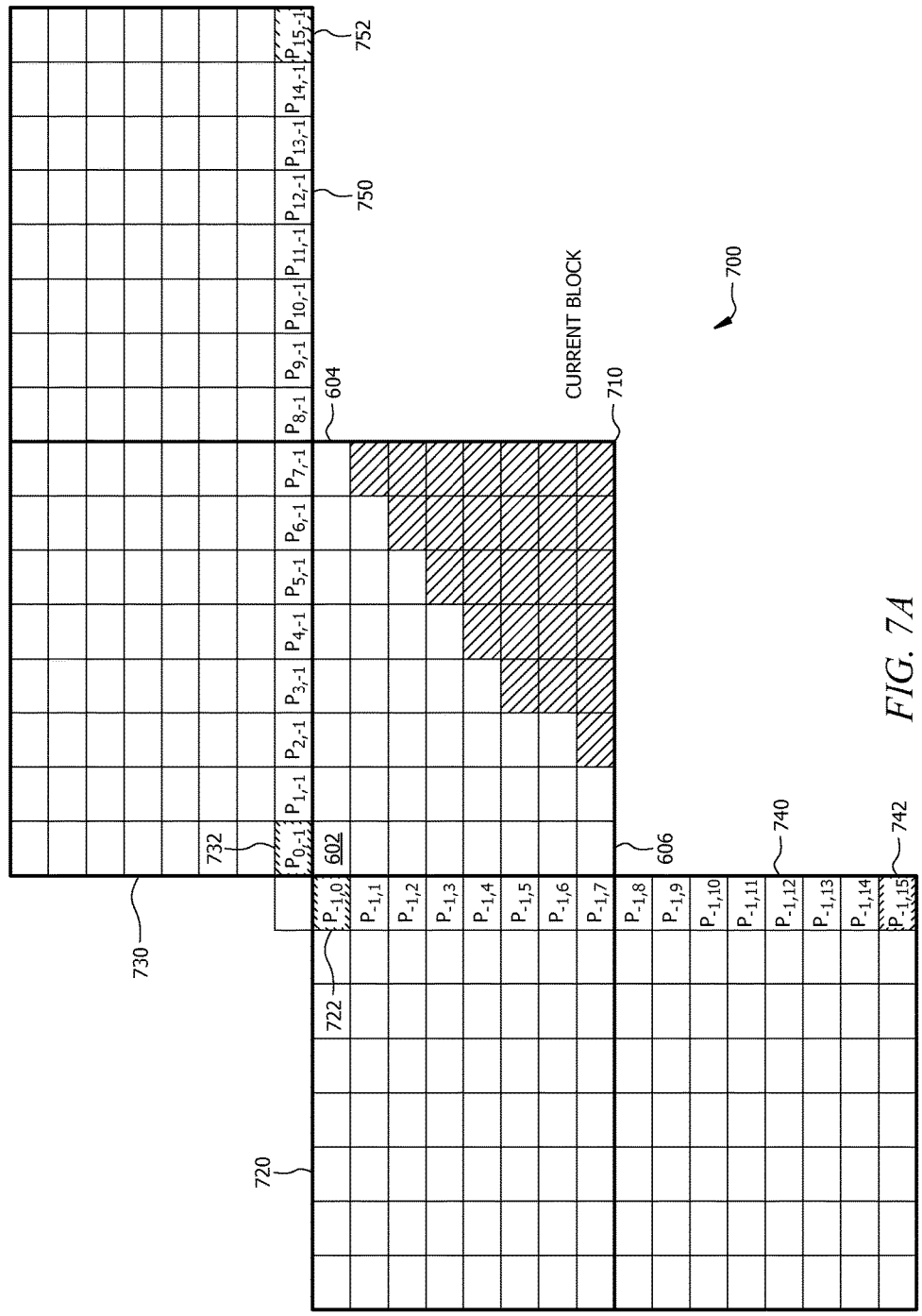
FIG. 7A is a schematic diagram showing an embodiment of a depth map intra prediction scheme.

FIG. 7A illustrates an embodiment of a depth map intra prediction scheme 700, which is used to select reference samples for predicting partition $P_1$ of FIG. 6A. As described above, to predict the top-left part (i.e., partition $P_0$ shown as white samples) of a current block 710, the scheme 700 uses reference pixel 722 (i.e., $p_{-1,0}$) and reference pixel 732 (i.e., $p_{0,-1}$), which are located in an left neighboring block 720 and a upper neighboring block 730, respectively. Further, based on the availability of neighboring reference pixels, the scheme 700 predicts the bottom-right region (i.e., partition $P_1$ shown as black samples) using extended neighboring blocks. In an embodiment, given a current block size of N×N, the scheme 700 first checks whether pixel 742 (i.e., $p_{-1,2*N-1}$) and pixel 752 (i.e., $p_{2*N-1,-1}$) are available. Pixel 742 is located at the bottom-right corner of a lower-left neighboring block 740, while pixel 752 is located at the bottom-right corner of an upper-right neighboring block 750. As shown in FIG. 7A, both blocks 740 and 750 are diagonally adjacent to the current block 710.

If both pixels 742 and 752 are available, the scheme 700 then calculates an absolute value of difference between pixels 742 and 722, wherein the absolute difference is expressed as $abs(p_{-1,2*N-1}-p_{-1,0})$. Similarly, the scheme 700 calculates an absolute value of difference between pixels 752 and 732, wherein the absolute difference is expressed as $abs(p_{2*N-1,-1}-p_{0,-1})$. The scheme 700 then compares the two absolute values. If $abs(p_{-1,2*N-1}-p_{-1,0})$ is larger than $abs(p_{2*N-1,-1}-p_{0,-1})$, the value of pixel 742 (i.e., $p_{-1,2*N-1}$) is used as the DC predictor of partition $P_1$. Otherwise, if $abs(p_{-1,2*N-1}-p_{-1,0})$ is smaller than or equal to $abs(p_{2*N-1,-1}-p_{0,-1})$, the value of pixel 752 (i.e., $p_{2*N-1,-1}$) is used as the DC predictor of partition $P_1$. Furthermore, if one of the pixels 742 and 752 are unavailable, the other one can be used as the reference pixel. If neither of pixels 742 and 752 are available, the closest available neighboring pixels can be used to pad pixels 742 and 752.

In an embodiment, the DC estimation algorithm illustrated by scheme 700 is expressed as the following operation:

If $p_{-1,2*N-1}$ and $p_{2*N-1,-1}$ are both available, $$DC_{1-X}=abs(p_{-1,2*N-1}-p_{-1,0})>abs(p_{2*N-1,-1}-p_{0,-1})?p_{-1,2*N-1}:p_{2*N-1,-1} \quad (5)$$

Figure 7B:
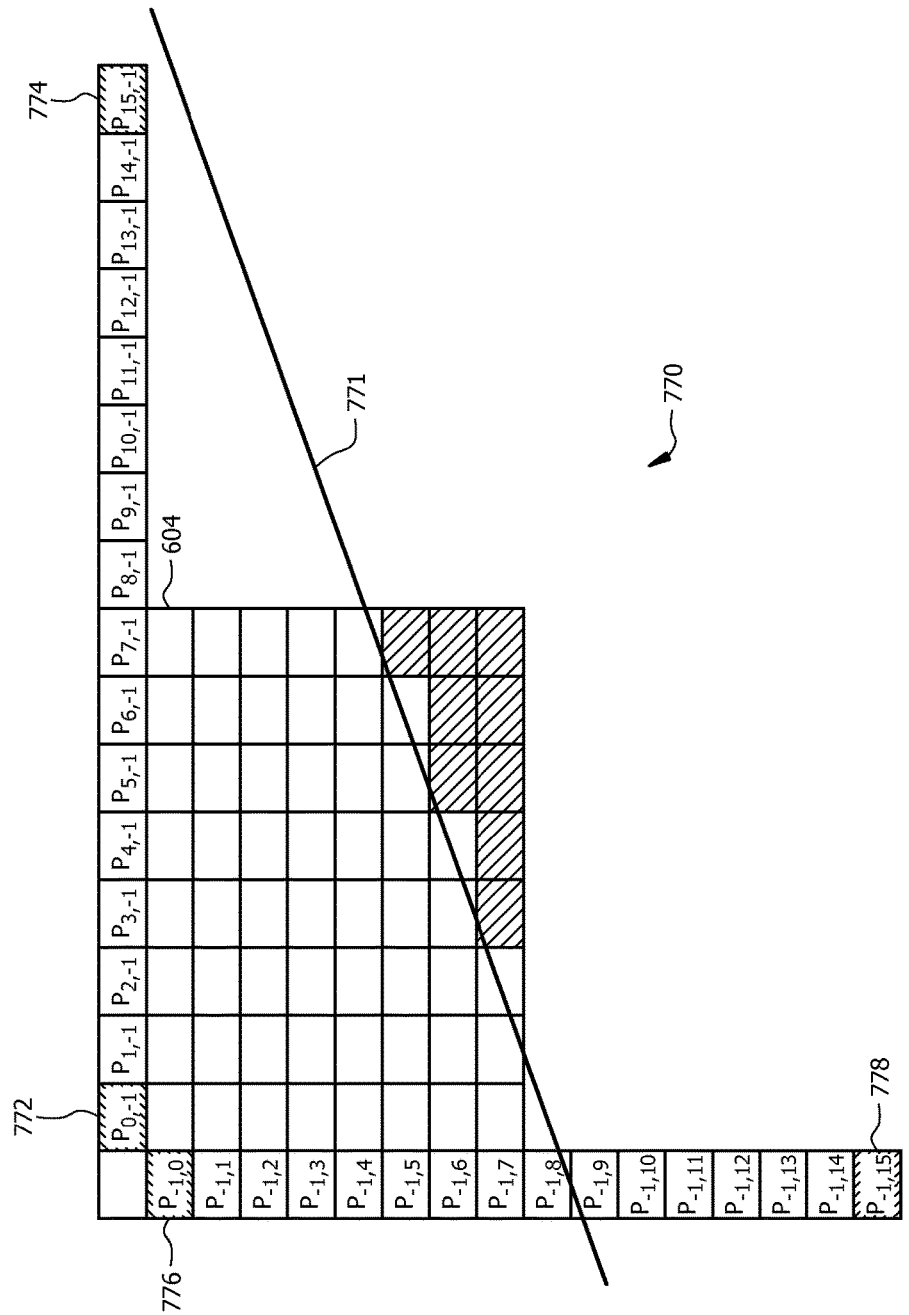
FIGS. 7B and 7C are schematic diagrams showing reference sample selection schemes to further illustrate principles behind the scheme in FIG. 7A.
Figure 7C:
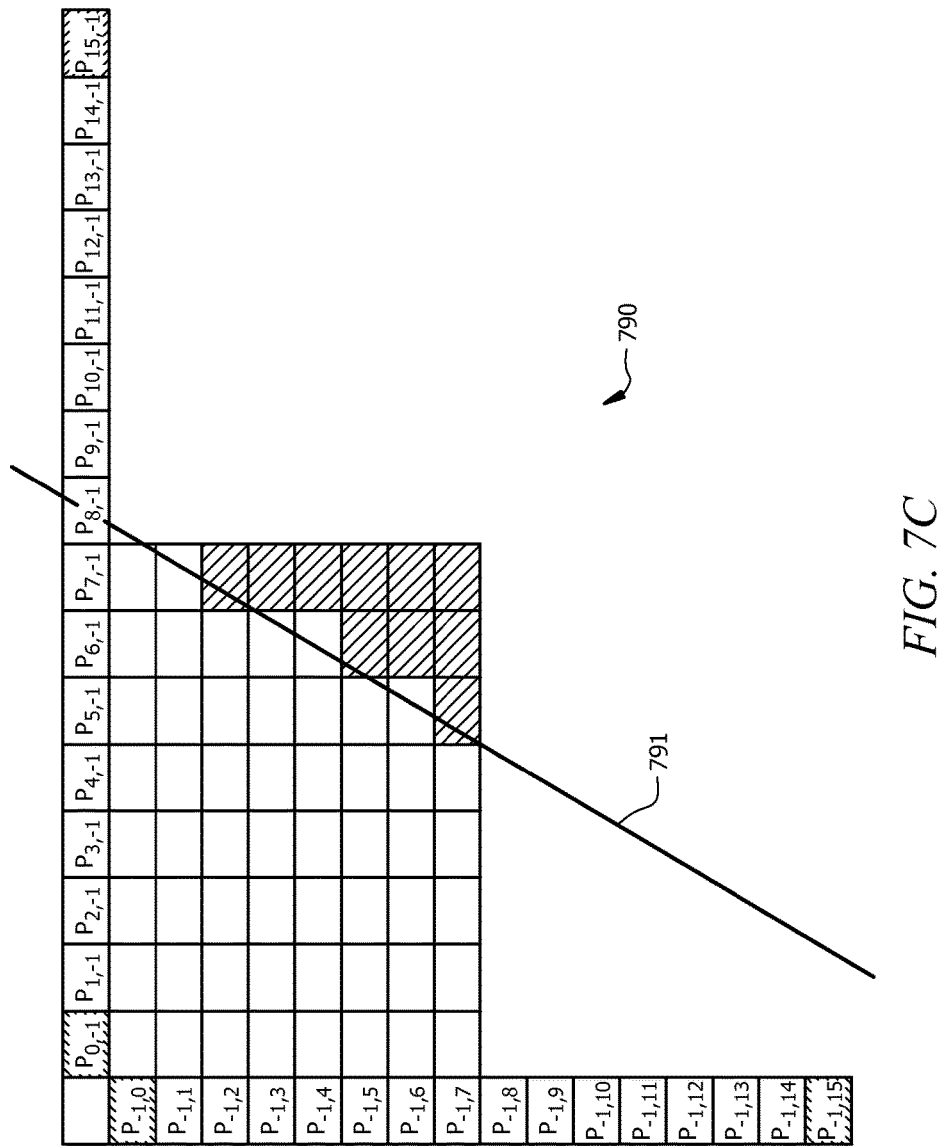

FIGS. 7B and 7C show reference sample selection schemes 770 and 790, respectively, to further illustrate principles behind operation (5). FIGS. 7B and 7C are similar to FIG. 7A because they all belong to Case 1, where three of the four corner pixels in the current block belong to the same partition $P_0$. FIG. 7B shows an extreme case of a nearly horizontal boundary between partitions $P_0$ and $P_1$. In FIG. 7B, sample 772 ($p_{0,-1}$) is adjacent to the top-left partition $P_0$, and sample 774 ($p_{15,-1}$) is close to partition $P_0$ but relatively far from the bottom-right partition $P_1$. Sample 778 is relatively close to partition $P_1$. Since partition boundaries are generally designed to reflect sharp edges, samples located on the same side of a boundary line 771 likely have similar luma/chroma values, while samples located on opposite sides of the boundary line 771 likely have significantly different luma/chroma values. Thus, judging from the direction of the boundary line 771, $p_{15,-1}$ likely has luma/chroma values similar to $p_{0,-1}$, while $p_{-1,15}$ likely has luma/chroma values different from $p_{-1,0}$. Because reference sample 778

(i.e., $p_{-1,15}$, which is at the same position as pixel or sample 742 in FIG. 7A) is located on the same side of the boundary line 771 as the partition $P_1$, $p_{-1,15}$ should be selected to predict the DC of partition $P_1$. Equation (5) confirms this principle by calculating the absolute differences abs($p_{-1,15}$−$p_{-1,0}$) and abs($p_{15,-1}$−$p_{0,-1}$), because in FIG. 7B abs($p_{-1,15}$−$p_{-1,0}$) would likely be greater than abs($p_{15,-1}$−$p_{0,-1}$).

Similarly, FIG. 7C shows another extreme case of a nearly vertical boundary between partitions $P_0$ and $P_1$. Since partition boundaries are generally designed to reflect sharp edges, samples located on the same side of a boundary line 791 likely have similar luma/chroma values, while samples located on opposite sides of the boundary line 791 likely have significantly different luma/chroma values. Thus, $p_{15,-1}$ likely has luma/chroma values different from $p_{0,-1}$, while $p_{-1,15}$ likely has luma/chroma values similar to $p_{-1,0}$. Because reference sample $p_{15,-1}$, which is at the same position as sample 752 in FIG. 7A, is located on the same side of the boundary line 791 as the partition $P_1$, $p_{15,-1}$ should be selected to predict the DC of partition $P_1$. Equation (5) confirms this principle by calculating the absolute differences abs($p_{-1,15}$−$p_{-1,0}$) and abs($p_{15,-1}$−$p_{0,-1}$), because in FIG. 7C abs($p_{15,-1}$−$p_{0,-1}$) would likely be greater than abs($p_{-1,15}$−$p_{-1,0}$).

As mentioned above with respect to FIG. 6A, the schemes 700, 770, and 790 are used for Case 1 when the three corner samples 602, 604, and 606 all belong to the same partition $P_0$. Under this condition, equation (5) can be equivalently converted to three separate operations:

$$vertAbsDiff = Abs(p[-1][0] - p[-1][nTbS*2-1]) \qquad (6)$$

$$horAbsDiff = Abs(p[0][-1] - p[nTbS*2-1][-1]) \qquad (7)$$

$$dcValBR = (horAbsDiff > vertAbsDiff)?p[nTbS*2-1][-1]:p[-1][nTbS*2-1]) \qquad (8)$$

Variables used in operations (6-8) are specified in the HEVC standard, which is incorporated herein by reference, and would be readily understood by one skilled in the art. According to the section of the HEVC standard "Depth partition value derivation and assignment process," the following operations and procedures can be used to encode a current block. Note that inputs to the coding process are (1) neighboring samples p[x][y], with x=−1, y=1 . . . nTbS*2−1 and x=0 . . . nTbS*2−1, y=−1; (2) a binary array partitionPattern[x][y], with x, y=0 . . . nTbS−1, specifying a partitioning of the prediction block in a partition 0 and a partition 1; (3) a sample location (xTb, yTb) specifying the top-left sample of the current block relative to the top-left sample of the current picture; and (4) a variable nTbS specifying the transform block size. Outputs of the coding process are predicted samples predSamples[x][y], with x, y=0 . . . nTbS−1.

In an embodiment, variables vertEdgeFlag and horEdgeFlag are derived as specified in the following:

$$vertEdgeFlag = (partitionPattern[0][0]!=partitionPattern[nTbS-1][0]) \qquad (I-61)$$

$$horEdgeFlag = (partitionPattern[0][0]!=partitionPattern[0][nTbS-1]) \qquad (I-62)$$

The variables dcValBR and dcValLT are derived as specified in the following:
If vertEdgeFlag is equal to horEdgeFlag, the following applies:
The variable dcValBR is derived as follows:
If horEdgeFlag is equal to 1, the following applies:

$$dcValBR = ((p[-1][nTbS-1]+p[nTbS-1][-1])>>1) \qquad (I-63)$$

Otherwise (horEdgeFlag is equal to 0), the following applies:

$$vertAbsDiff = Abs(p[-1][0]-p[-1][nTbS*2-1]) \qquad (I-64)$$

$$horAbsDiff = Abs(p[0][-1]-p[nTbS*2-1][-1]) \qquad (I-65)$$

$$dcValBR = (horAbsDiff > vertAbsDiff)?p[nTbS*2-1][-1]:p[-1][nTbS*2-1]) \qquad (I-66)$$

The variable dcValLT is derived as follows:

$$dcValLT = (p[-1][0]+p[0][-1])>>1 \qquad (I-67)$$

Otherwise (horEdgeFlag is not equal to vertEdgeFlag), the following applies:

$$dcValBR = horEdgeFlag?p[-1][nTbS-1]:p[nTbS-1][-1] \qquad (I-68)$$

$$dcValLT = horEdgeFlag?p[(nTbS-1)>>1][-1]:p[-1][(nTbS-1)>>1] \qquad (I-69)$$

The predicted sample values predSamples[x][y] are derived as specified in the following:
For x in the range of 0 to (nTbS−1), inclusive the following applies:
For y in the range of 0 to (nTbS−1), inclusive the following applies:
The variables predDcVal and dcOffset are derived as specified in the following:

$$predDcVal = (partitionPattern[x][y]==partitionPattern[0][0])?dcValLT:dcValBR \qquad (I-70)$$

$$dcOffset = DcOffset[xTb][yTb][partitionPattern[x][y]] \qquad (I-71)$$

If DltFlag[nuh_layer_id] is equal to 0, the following applies:

$$predSamples[x][y] = predDcVal + dcOffset \qquad (I-72)$$

Otherwise (DltFlag[nuh_layer_id] is equal to 1), the following applies:

$$predSamples[x][y] = Idx2DepthValue[Clip1_Y(DepthValue2Idx[predDcVal]+dcOffset)]$$

Note that reference pixels that can be used for DC prediction are not limited to positions shown in FIGS. 7A-7C. Any weighted combination of reference pixels may be used for DC prediction. An exemplary combination is given as:

$$DC = a_1*p_{x1,y1} + a_2*p_{x2,y2} + a_3*p_{x3,y3} + \ldots a_n*p_{xn,yn},$$

where $a_1 \ldots a_n$ are weighting coefficients and $p_{x1,y1} \ldots p_{xn,yn}$ are neighboring reference pixels, and DC is the predicted value of the partition.

In an embodiment, a weighted average of $p_{-1,N-1}$ and $p_{N-1,-1}$ is used to predict the bottom-right partition $P_1$ via:

$$DC_{right-bottom} = a_1*p_{-1,N-1} + a_2*p_{N-1,-1},$$

where $a_1$ and $a_2$ are weighting coefficients.

In this embodiment, reference pixels in the upper-right and lower-left blocks may be used for DC prediction for any of the cases in FIGS. 6A-6D (not only limited to Case 1). An exemplary algorithm is given as:

$$DC = a_1*p_{x1,y1} + a_2*p_{x2,y2} + a_3*p_{x3,y3} + \ldots a_M*p_{xM,yM},$$

where xM and yM can be larger than the block size N.

Referring back to Case 3 in FIG. 6C, in an embodiment, a weighted average of $p_{-1,0}$, $p_{(N-1)>>1,-1}$, $p_{0,-1}$ and $p_{N-1,-1}$ can be used to predict the DC of the top partition $P_0$ as follows:

$$DC_{up} = a_1*p_{-1,0} + a_2*p_{(N-1)>>1,-1} + a_3*p_{0,-1} + a_4*p_{N-1,-1},$$

where $a_1$, $a_2$, $a_3$, and $a_4$ are weighting coefficients.

For example, $p_{N-1,-1}$ and $p_{N,-1}$ are used to predict the DC of the Case 4 in FIG. 6D as follows:

$$DC_{right} = a_1 * p_{N,-1} + a_2 * p_{N-1,-1}.$$

Figures 8A, 8B:
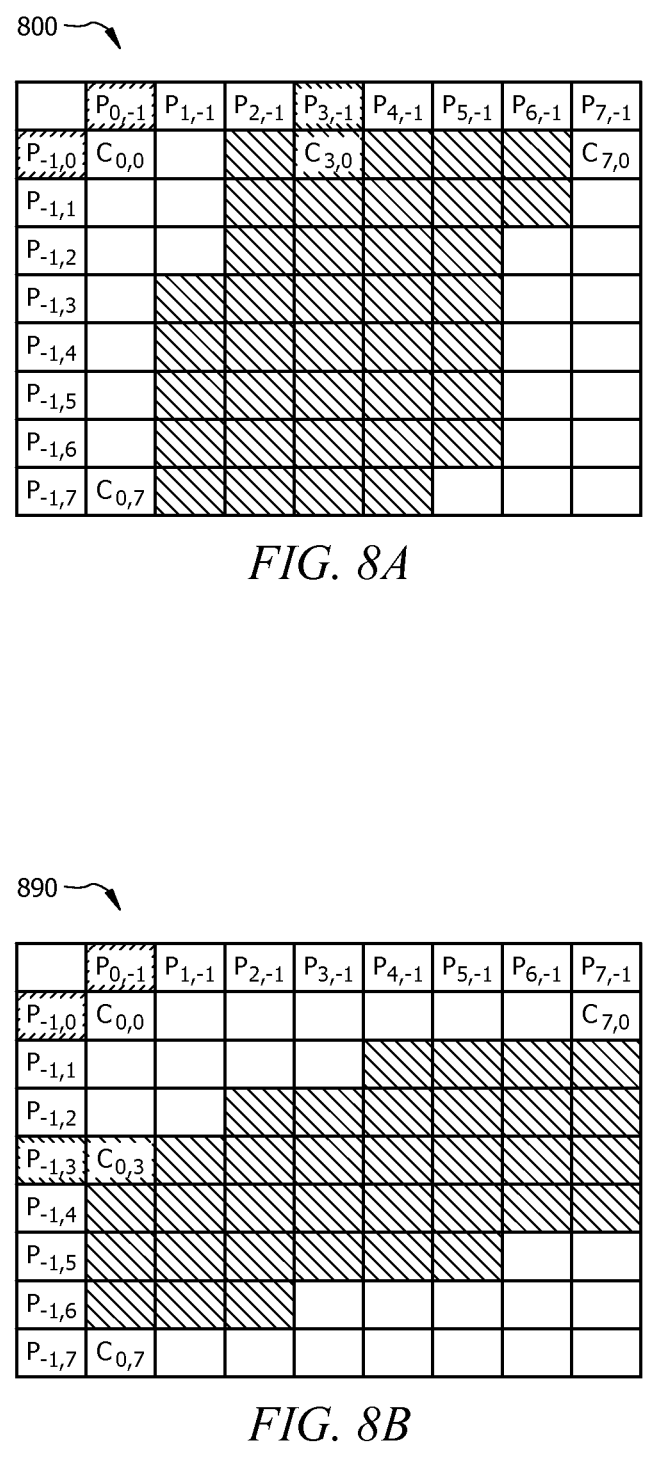

In addition to the scheme 700, other alternative schemes may be used to select one or more optimal reference pixels for predicting the partition $P_1$. FIGS. 8A and 8B illustrate embodiments of reference sample selection schemes 800 and 850, respectively. Although appearing somewhat different, the partition patterns in FIGS. 8A and 8B also belong to Case 1 (as does FIG. 6A). The common feature is that, given a block size equal to N×N, the partition value of top-right pixel, ($c_{0, N-1}$), is the same as the top-left pixel, ($c_{0,0}$); and the partition value of left-bottom pixel, ($c_{N-1,0}$), in the partition block is the same as the top-left pixel, ($c_{0,0}$). Accordingly, in an embodiment, the DC value of pixels in the contour partition $P_1$ (black pixels in FIGS. 8A and 8B) may be determined in the same fashion as the bottom-right partition $P_1$ in FIG. 6A. However, special features of the partition patterns 800 and 850 make other pixels better DC reference samples.

FIG. 8A shows a Case 1 sub-case (Case 1a) where ($c_{0,0}$), ($c_{7,0}$), and ($c_{0,7}$) have the same partition value, but such partition value is different from the partition value of ($c_{3,0}$). FIG. 8B shows another Case 1 sub-case (Case 1b) where ($c_{0,0}$), ($c_{7,0}$) and ($c_{0,7}$) have the same partition value, but such partition value is different from the partition value of ($c_{0,3}$). In practice, if any partition value on the top-row of ($c_{0,0}$) and ($c_{N,0}$) are not the same as the binary partition value of ($c_{0,0}$), as shown in FIG. 8A, it means this partition pattern is predicted by DMM4 mode (generally, all of DMM1-4 may be used under Case 1). Similarly, if any partition value between the left-column of ($c_{0,0}$) and ($c_{0,N}$) are not the same as ($c_{0,0}$), as shown in FIG. 8B, it means this partition pattern is also predicted by DMM4. Considering differences between FIGS. 8A-8B and FIG. 6A, the reference pixels between $p_{0,-1}$ and $p_{N,-1}$ or pixels between $p_{-1,0}$ and $p_{-1,N}$ (e.g., the reference pixels $p_{3,-1}$ and $p_{-1,3}$) may make better DC predictors. In an embodiment of the scheme 800, the DC value of pixels in the contour partition $P_1$ is set as the value of a middle reference pixel ($p_{(N-1)>>1,-1}$) or ($p_{N>>1,-1}$). Similarly, in an embodiment of the scheme 850, the DC value of the partition $P_1$ is set as the value of a middle reference pixel ($p_{-1, (N-1)>>1}$) or ($p_{-1,N>>1}$).

In an embodiment, if the partition value of a top-middle pixel ($c_{(N-1)>>1,0}$) in the current block is different from the partition value of a top-left sample ($c_{0,0}$) as shown in FIG. 8A, then a top-middle reference pixel ($p_{(N-1)>>1,-1}$) is selected as the DC predictor of the contour partition $P_1$. Alternatively, if the partition value of a left-middle pixel in the left-column of the current block ($c_{0, (N-1)>>1}$) is different from the partition value of a top-left pixel, ($c_{0,0}$), as shown in FIG. 8B, then a left-middle reference pixel, ($p_{-1, (N-1)>>1}$), is selected as the predictor of the DC value of the contour partition $P_1$. Although not shown in FIG. 8A or 8B, if the partition value of a left-middle pixel, ($c_{0, (N-1)>>1}$) is the same as the partition value of a top-middle pixel, ($c_{(N-1)>>1,0}$), then an average of the left-middle reference pixel, ($p_{-1, (N-1)>>1}$) and the top-middle reference pixel, ($p_{(N-1)>>1,-1}$) may be used as the DC predictor of the contour partition $P_1$.

The above-described embodiment of DC estimation algorithm under Case 1 can be described using the following operations:

Set $bTM=(b\text{Pattern}_{0,0} != b\text{Pattern}_{(N-1)>>1,0})$ 1:0, and (9)

set $bLM=(b\text{Pattern}_{0,0} != b\text{Pattern}_{0,(N-1)>>1})$ ?1:0. (10)

If bTM does not equal bLM, $$DC_{right-bottom} = bLM ? p_{-1,(N-1)>>1} : p_{(N-1)>>1,-1}; \quad (11)$$

Otherwise, $$DC_{right-bottom} = (p_{-1,(N-1)>>1} + p_{(N-1)>>1,-1}) >> 1. \quad (12)$$

The Case 1 shown in FIG. 6A may include another situation (denoted as Situation 2 herein), in which the partition value of a left-middle pixel ($c_{0, (N-1)>>1}$) is the same as the partition value of top-middle pixel ($c_{(N-1)>>1,0}$), or both ($c_{0, (N-1)>>1}$) and ($c_{(N-1)>>1,0}$) are equal to ($c_{0,0}$). In another embodiment for Situation 2, the above-described methods (e.g., with respect to operation (5)) still predicts the bottom-right partition $P_1$.

As mentioned previously, any of the thirty-five intra prediction modes and the new depth modes may be used for the intra prediction of a 3D-HEVC depth map. When a decoder performs depth intra prediction, decoded boundary samples of adjacent blocks are used as reference data for spatial prediction in regions where inter-picture prediction is not performed. All TUs within a PU may use the same associated intra prediction mode for one luma component and two chroma components. An encoder selects the best luma intra prediction mode of each PU from thirty-five options: thirty-three directional prediction modes, a DC mode, and a Planar mode, as shown in FIG. 1. For the luma component, neighboring reference samples may be filtered before the intra prediction process. Filtering is controlled by a given intra prediction mode and/or a transform block size. For instance, a filtering rule can be designed such that, neighboring samples are not filtered if the intra prediction mode is DC or the transform block size is equal to 4×4; further, filtering may be enabled if a distance between a given intra prediction mode and the vertical mode (or horizontal mode) is larger than a predefined threshold. An embodiment of predefined threshold is specified in Table 1, where nT represents a block (e.g., transform unit) size.

TABLE 1

Specification of predefined thresholds for various transform block sizes

|  | nT = 8 | nT = 16 | nT = 32 |
| --- | --- | --- | --- |
| Threshold | 7 | 1 | 0 |

Any suitable filter design may be implemented for filtering reference samples. For example, [1, 2, 1] filter and bi-linear filter can be used for neighboring sample filtering. In an embodiment, the bi-linear filtering is conditionally used if all of the following conditions are true:
strong_intra_smoothing_enable_flag is equal to 1;
transform block size is equal to 32;
Abs(p[−1][−1]+p[nT*2−1][−1]−2*p[nT−1][−1])<(1<<(Bit-DepthY−5)); and
Abs(p[−1][−1]+p[−1][nT*2−1]−2*p[−1][nT−1])<(1<<(Bit-DepthY−5)).

The filtering process of neighboring samples described above may be performed in depth intra map coding. Embodiments of reference sample filtering disclosed herein (including those below) achieve more accurate DC prediction and improves the performance of depth map coding. In an embodiment, filtering or smoothing is applied to reference pixels used for depth map intra prediction depending on an intra prediction mode (e.g., direction or angle) and/or a block size. For example, if the width or the height of a PU is smaller than or equal to 8 (i.e., $PU_{width/height}<=8$), the filtering of neighboring samples can be skipped to maintain sharp edges in neighboring samples. $PU_{width/height}$ is a variable to indicate the size of a PU/block, which means either width or height. If a width value is not equal to a height value of a block, the block is non-square. Otherwise, if the width value is equal to the height value of the block, the block is square.

A PU width/height used for making a reference sample filtering decision is not limited to $PU_{width/height}<=8$. In other words, any predefined range of the PU width/height (e.g., $a<=PU_{width/height}<=b$; or $PU_{width/height}<=a$ and $b<=PU_{width/height}$, where a and b are integers and b>a) may be used for making a reference sample filtering decision. For example, if a=4, b=16, the filtering condition can be such that if $4<=PU_{width/height}<=16$, filtering is skipped. For another example, if a=4, b=16, the filtering condition can be such that if $PU_{width/height}<=4$ or $16<=PU_{width/height}$, filtering is skipped. For yet another example, if a=4, b=8, the filtering condition can be such that if $4<=PU_{width/height}<=8$, filtering is skipped.

In an embodiment, certain intra prediction modes are pre-set to always select filtered reference samples for intra prediction. For example, the Planar mode and the DC mode may always use filtered reference samples for intra prediction. Alternatively, the filtering rule can be designed so that if an index of the intra prediction mode falls within a certain predefined range, the reference pixel filtering process is skipped. For example, the reference pixel filtering process can be skipped if intra prediction mode ID is 0 or 1. In yet another embodiment, a decision for reference sample filtering depends on the combination of a PU width/height and an intra mode. For example, reference sample filtering can be skipped if $4<=PU_{width/height}<=16$ and if the current prediction mode is Planar or DC.

Furthermore, the choice of filters used for smoothing may also be mode-dependent. That is, not all intra prediction modes apply the same filter. Any suitable filter coefficients may be designed for neighboring sample filtering. In other words, any weighted combination of the reference pixels may be used for neighboring sample filtering for depth intra prediction. An examplary combination is expressed as:

$$P_{x3,y3} = a_1 * p_{x1,y1} + a_2 * p_{x2,y2} + a_3 * p_{x3,y3} + \ldots a n * p_{xn,yn},$$

where $P_{x3,y3}$ is the filtered reference pixel, $p_{x1,y1}$, $p_{x2,y2}$, $p_{x3,y3} \ldots p_{xn,yn}$ are the reference pixels before filtering, and $a_1, a_2, a_3 \ldots, a_n$ are coefficients whose sum equal one.

In an embodiment, if multiple reference pixels are selected as a prediction value of a block partition, a simple pixel filter, such as one with [1,1] or [1,2,1] coefficients, can be used on the selected multiple reference pixels. Further, for reference pixel filtering decision of intra prediction mode, reference pixels are not limited to one column and one row of the neighbour blocks. Multiple rows, multiple columns, and combinations thereof in one or more neighboring reference blocks may be used for intra prediction. An examplary combination is given as:

$$P_{x3,y3} = a_1 * p_{x1,y1} + a_2 * p_{x2,y2} + a_3 * p_{x3,y3} + \ldots aM * p_{xM,yM},$$

where $P_{x3,y3}$ is the filtered reference pixel, and where xM and yM may be smaller than −1 indicating more than one row and more than one column from the neighboring reference blocks.

Further, sometimes the decision regarding whether to apply smoothing is based on the combination of an intra prediction mode, a PU/block size, and a smoothing flag. In an embodiment, a flag to indicate the on/off (or enabling/disabling) status of a filter is signalled in a bitstream. For example, a flag set to "0" indicates that filtering is turned off or disabled, while a flag set to "1" indicates that filtering is turned on or enabled; or vice versa. The flag may be signalled in a block syntax or in a picture-level syntax. Alternatively, the signalling flag may be implicitly derived. In this case, no flag bit is needed in the bitstream. For example, if reference pixel filtering is turned off for the depth map in the encoder and/or decoder (codec), it is not necessary to signal the flag in a picture-level syntax or in a block syntax. Otherwise, if reference pixel filtering is turned on, the flag is implied by some PU properties, such as PU size and/or the intra prediction mode used for the PU. For example, depth reference pixel filtering flag is derived as on or enabled when intra prediction modes are directional prediction modes (indexes 2-35), and the flag is derived as off or disabled for non-directional modes (planar and DC modes).

The partition values that can be used to check whether a block partition is a contour are not limited to a top-middle partition value ($c_{(N-1)>>1,0}$) or a left-middle partition value ($c_{0, (N-1)>>1}$), and any other appropriate samples and their weighted combinations may be used to determine whether a block partition is a contour partition. For example, if partition value ($c_{(N-1)>>2,0}$) were not equal to ($c_{0,0}$) in FIG. 6A, the block partition $P_1$ would be classified as a contour partition.

In an embodiment, we may use partition values to check not only the contour partition for Case 1 in FIG. 6A, but also the contour partitions for Cases 2-4 in FIGS. 6B-6D. DC predictions then may be made accordingly. For example, in Case 3 of FIG. 6C, if the top-middle partition value ($c_{(N-1)>>1,0}$) were different from the top-left partition value ($c_{0,0}$), then the partition of this block would belong to contour partition $P_1$. In that case, the top-middle reference pixel value ($p_{(N-1)>>1,-1}$) should not be used as the DC predictor for the upper partition $P_0$. Instead, an average of an upper-right reference pixel ($p_{N-1,-1}$) and an upper-left reference pixel ($p_{0,-1}$) may be used as the DC predictor for the upper partition $P_0$.

FIGS. 9A and 9B show simulation results obtained by using reference sample selection and filtering techniques presented herein. Specifically, FIG. 9A shows BD rate results for 3-view case under Intra-only, and FIG. 9B shows BD rate results for 3-view case under Common Test condition. Based on the results, the described depth map reference pixel selection and filtering techniques improve the coding efficiency both in a 3D-HEVC random access (under CTC) and in an All-Intra configuration. For instance, as shown in FIG. 9A, the video peak signal-to-noise ratio (PSNR)/total bitrate decreased by an average of 0.03% and the synthesized PSNR/total bitrate decreased by an average of 0.01%. As shown in FIG. 9B, the video PSNR/total bitrate decreased by an average of 0.1% and the synthesized PSNR/total bitrate also decreased by an average of 0.1%.

Figure 10:
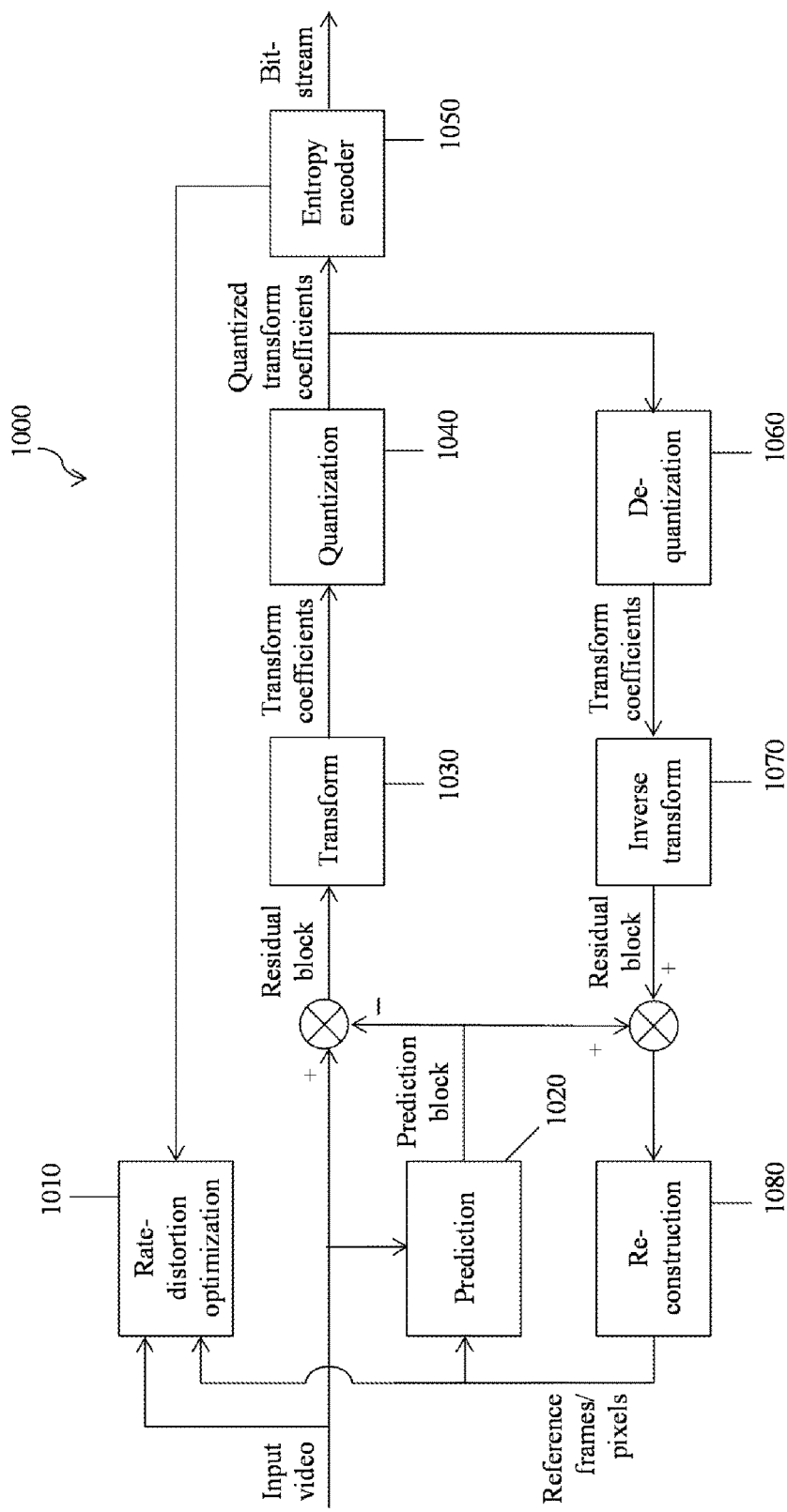
FIG. 10 is a schematic diagram showing an embodiment of a video encoder.

FIG. 10 illustrates an embodiment of a video encoder 1000, in which disclosed intra prediction embodiments (e.g., the schemes 700, 770, 790, 800, and 850) are implemented. Note that the disclosed embodiments can also be implemented in other video codec structures. The video encoder 1000 comprises a rate-distortion optimization (RDO) module 1010, a prediction module 1020, a transform module 1030, a quantization module 1040, an entropy encoder 1050, a de-quantization module 1060, an inverse transform module 1070, and a reconstruction module 1080 arranged as shown in FIG. 10. In operation, the video encoder 1000 may receive an input video comprising a sequence of video frames (or slices). Herein, a frame may refer to any of a predicted frame (P-frame), an intra-coded frame (I-frame), or a bi-predictive frame (B-frame). Likewise, a slice may refer to any of a P-slice, an I-slice, or a B-slice.

The RDO module 1010 may be configured to coordinate or make logic decisions for one or more of other modules. For example, based on one or more previously encoded frames, the RDO module 1010 may determine how a current frame (or slice) being encoded is partitioned into a plurality of coding units (CUs), and how a CU is partitioned into one or more prediction units (PUs) and transform units (TUs). CU, PU, and TU are various types of blocks used in HEVC. In addition, the RDO module 1010 may determine how the current frame is to be predicted. The current frame may be predicted via inter and/or intra prediction. For intra prediction, there are a plurality of available prediction modes or directions in HEVC (e.g., thirty-five modes in FIG. 1 and DMM modes), and an optimal mode may be determined by the RDO module 1010. For example, the RDO module 1010 may calculate a sum of absolute error (SAE) for each prediction mode, and select a prediction mode that results in the smallest SAE.

The prediction module 1020 may utilize either reference frames for inter prediction or reference pixels in the current frame for intra prediction. In an embodiment, the prediction module 1020 is configured to compute a prediction block for a current block from the input video. The prediction block comprises a plurality of predicted samples, each of which may be generated based on a plurality of reconstructed samples located in the left and upper neighboring blocks (already decoded) of the current block.

Upon generation of the prediction block, the current block may be subtracted by the prediction block, or vice versa, to generate a residual block. The residual block may be fed into the transform module 1030, which may convert residual chroma samples into a matrix of transform coefficients. The transform may be a two-dimensional orthogonal transform, such as the discrete cosine transform (DCT). Then, the matrix of transform coefficients may be quantized by the quantization module 1040 before being fed into the entropy encoder 1050. The quantization module 1040 may alter the scale of the transform coefficients and round them to integers, which may reduce the number of non-zero transform coefficients. As a result, a compression ratio may be increased. Quantized transform coefficients may be scanned and encoded by the entropy encoder 1050 into an encoded bitstream. Further, to facilitate continuous encoding of chroma blocks, the quantized transform coefficients may also be fed into the de-quantization module 1060 to recover the original scale of the transform coefficients. Then, the inverse transform module 1070 may perform the inverse of the transform module 1030 and generate a noisy version of the original residual block. Then, the residual block may be fed into the reconstruction module 1080, which may generate reconstructed luma and/or chroma samples for intra prediction of future chroma blocks. If desired, filtering may be performed on the reconstructed samples before they are used for intra prediction.

FIG. 10 is a simplified illustration of a video encoder, and may only include some of the modules present in the video encoder. Other modules (e.g., filter, scanner, and transmitter), although not shown in FIG. 10, may also be included to facilitate video encoding as understood by one of skill in the art. In addition, depending on the encoding scheme, some of the modules in the video encoder may be skipped. For example, in lossless encoding of certain video content, no information loss is allowed, thus the quantization module 1040 and the de-quantization module 1060 are skipped. For another example, if the residual block is encoded directly without being converted to transform coefficients, the transform module 1030 and the inverse transform module 1070 are skipped. Moreover, prior to transmission from the encoder, the encoded bitstream may be configured to include other information, such as video resolution, frame rate, block partitioning information (sizes, coordinates), prediction modes, etc., so that the encoded sequence of video frames can be properly decoded by a video decoder.

Figure 11:
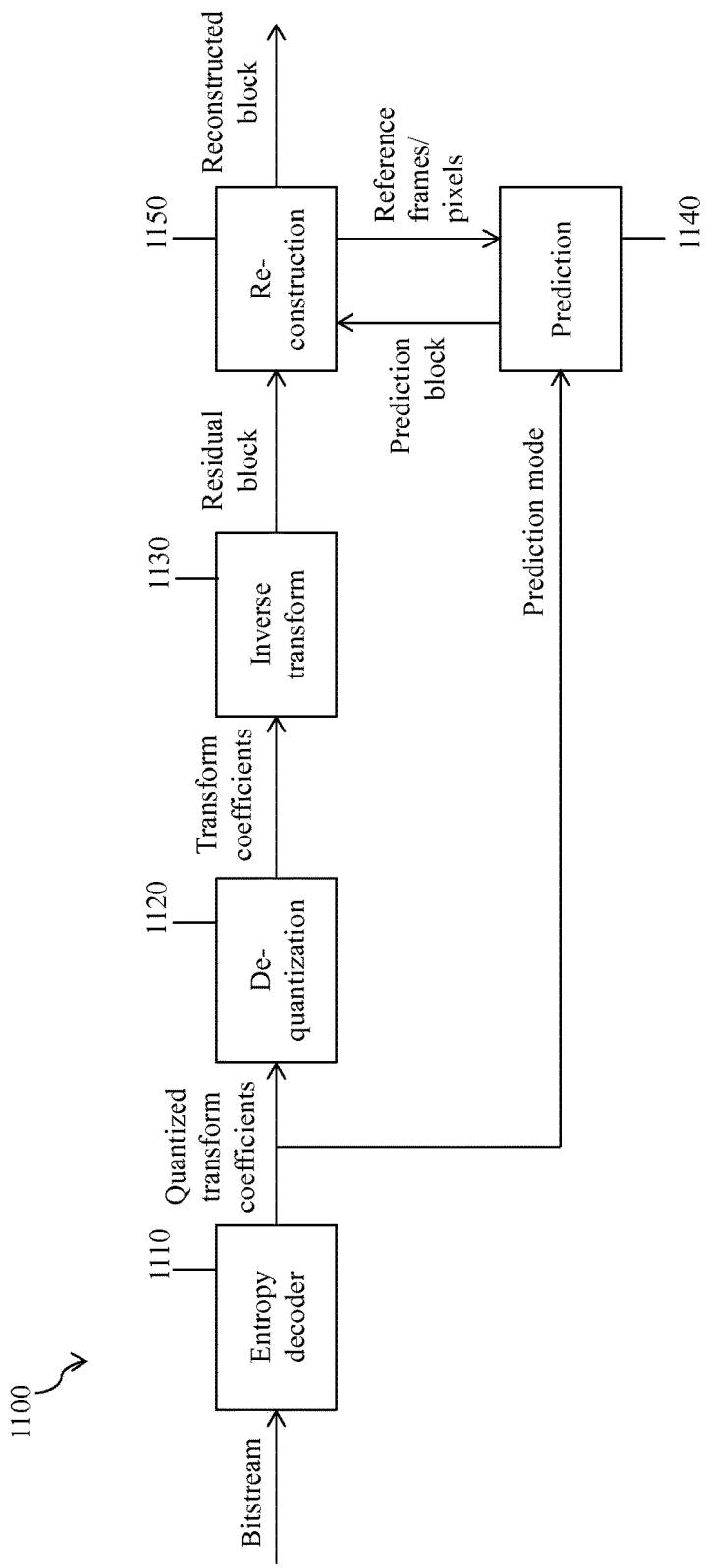
FIG. 11 is a schematic diagram showing an embodiment of a video decoder.

FIG. 11 illustrates an embodiment of a video decoder 1100, in which disclosed intra prediction embodiments are implemented. The video decoder 1100 corresponds to the video encoder 1000, and comprises an entropy decoder 1110, a de-quantization module 1120, an inverse transform module 1130, a prediction module 1140, and a reconstruction module 1150 arranged as shown in FIG. 11. In operation, an encoded bitstream containing information of a sequence of video frames is received by the entropy decoder 1110, which decodes the bitstream to an uncompressed format. A matrix of quantized transform coefficients may be generated, which is then fed into the de-quantization module 1120. The de-quantization module 1120 may be the same or similar to the de-quantization module 1060 in FIG. 10. Then, output of the de-quantization module 1120 feeds into the inverse transform module 1130, which converts transform coefficients to residual values of a residual block. In addition, information containing a prediction mode (e.g., a directional intra prediction mode) of the current block is also decoded by the entropy decoder 1110. Based on the prediction mode, the prediction module 1140 may generate a prediction block for the current block.

In an embodiment, the prediction module 1140 is configured to use a disclosed reference sample selection and/or filtering embodiment. The prediction block comprises a plurality of predicted samples, each of which may be generated based on a plurality of reconstructed samples located in the left and upper neighboring blocks (already decoded) of the current block. Upon generation of the prediction block for the current block, the reconstruction module 1150 may combine the residual chroma block with the prediction block to generate a reconstructed block. Additionally, to facilitate continuous decoding, some samples of the reconstructed block may also serve as reference pixels for intra prediction of future blocks in the same video slice or frame.

Figure 12:
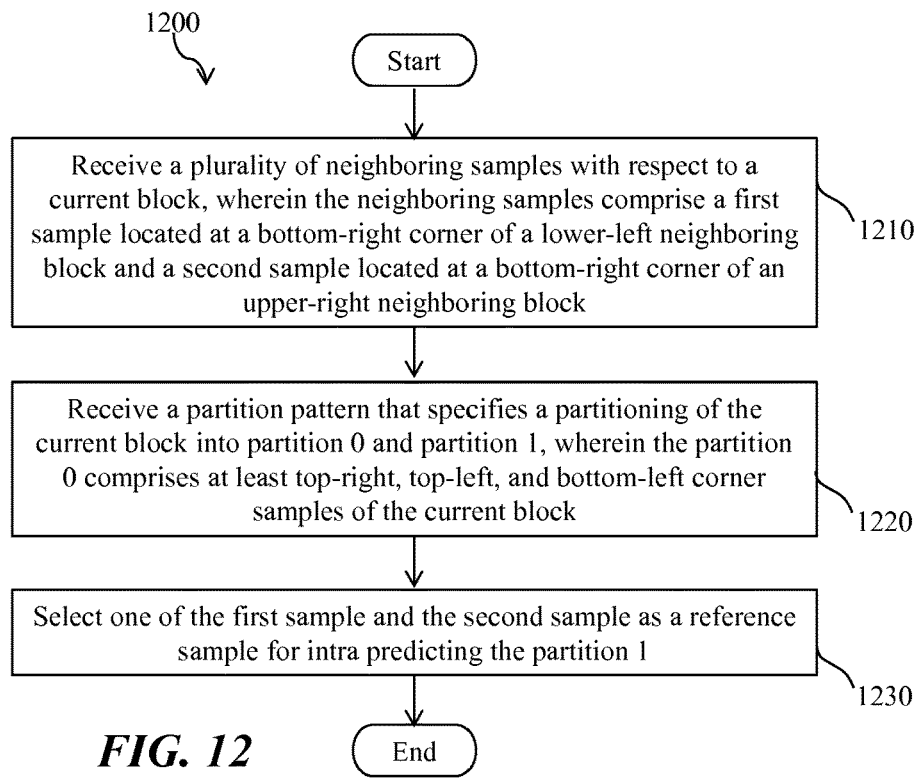
FIG. 12 is a flowchart showing an embodiment of an intra prediction method.

FIG. 12 is a flowchart showing an embodiment of an intra prediction method 1200, which is implemented in a 3D-HEVC video codec (e.g., the encoder 1000 or the decoder 1100). The method 1200 starts in step 1210, in which a processor or a transceiver in the codec receives a plurality of neighboring samples with respect to a current block. The neighboring samples comprise a first sample (e.g., sample 742 in FIG. 7A) located at a bottom-right corner of a lower-left neighboring block and a second sample (e.g., sample 752 in FIG. 7A) located at a bottom-right corner of an upper-right neighboring block. In step 1220, the processor or transceiver receives a partition pattern that specifies a partitioning of the current block into partition 0 ($P_0$) and partition 1 ($P_1$). To satisfy Case 1 (e.g., shown in FIGS. 6A, 7A-7C, 8A-8B), the partition 0 would comprise at least top-right, top-left, and bottom-left corner samples of the current block. In step 1230, the processor selects one of the first sample and the second sample as a reference sample for intra predicting the partition 1.

In an embodiment, the neighboring samples are denoted as p[x][y], with x=1, y=1 . . . nTbS*2−1 and with x=0 . . . nTbS*2−1, y=−1, where nTbS specifies a size of the current block. The first and second samples are represented by p[−1][nTbS*2−1] and p[nTbS*2−1][−1], respectively. In step 1230, the selection of the reference sample is based on a first absolute difference between samples p[−1][0] and p[−1][nTbS*2−1] and a second absolute difference between samples p[0][−1] and p[nTbS*2−1][−1]. Further, the first and second absolute differences may be denoted as vertAbsDiff and horAbsDiff, respectively, which are calculated using operations (6) and (7) discussed above. In an embodiment, the reference sample is used as a DC mean value, denoted as dcValBR, and calculated using operation (8) discussed above.

Figure 13:
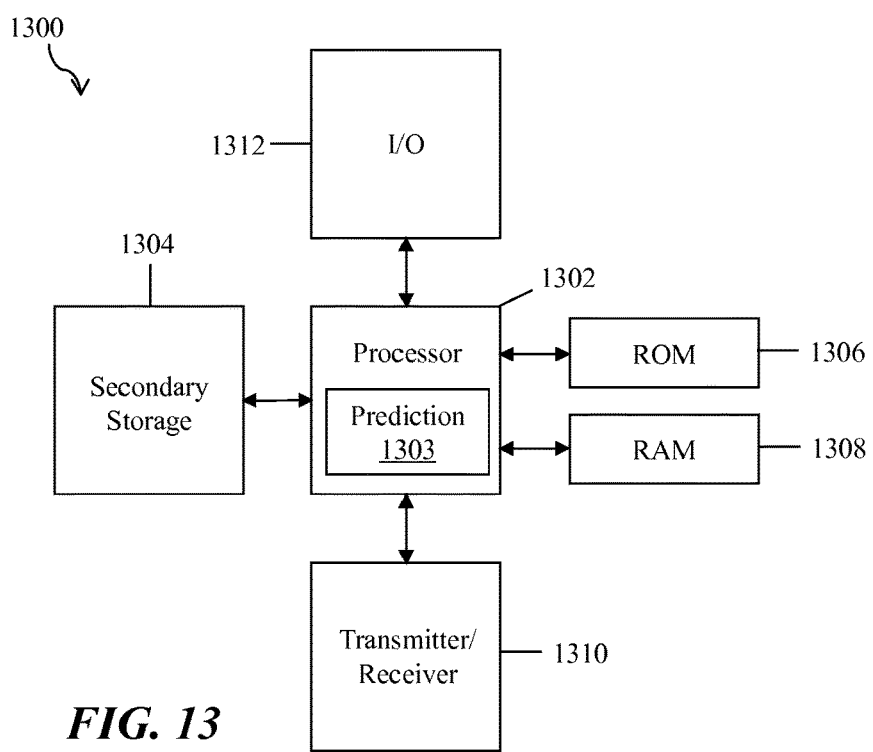
FIG. 13 is a schematic diagram showing a general-purpose computer system.

The schemes described above may be implemented on any general-purpose computer system, such as a computer or network component with sufficient processing power, memory resources, and network throughput capability to handle the necessary workload placed upon it. FIG. 13 illustrates a schematic diagram of a general-purpose computer system 1300 suitable for implementing one or more embodiments of the systems and methods disclosed herein, such as the video encoder 1000, the video decoder 1100, and the intra prediction method 1200. The computer system 1300 includes a processor 1302 (which may be referred to as a central processor unit or CPU) that is in communication with memory devices including secondary storage 1304, read only memory (ROM) 1306, random access memory (RAM) 1308, transmitter/receiver 1310, and input/output (I/O) device 1312. Although illustrated as a single processor, the processor 1302 is not so limited and may comprise multiple processors. The processor 1302 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 1302 is configured to implement any of the schemes described herein, such as the schemes 700, 770, 790, 800, and 850, and the method 1200. The processor 1302 may be implemented using hardware, software, or both. The processor 1302 comprises a prediction module 1303, which may be similar to the prediction module 1020. The prediction module 1303 may implement reference sample selection/filtering techniques disclosed herein for the intra prediction of a depth map in 3D-HEVC.

The secondary storage 1304 is typically comprised of one or more disk drives or tape drives and is used for non-volatile storage of data and as an over-flow data storage device if the RAM 1308 is not large enough to hold all working data. The secondary storage 1304 may be used to store programs that are loaded into the RAM 1308 when such programs are selected for execution. The ROM 1306 is used to store instructions and perhaps data that are read during program execution. The ROM 1306 is a non-volatile memory device that typically has a small memory capacity relative to the larger memory capacity of the secondary storage 1304. The RAM 1308 is used to store volatile data and perhaps to store instructions. Access to both the ROM 1306 and the RAM 1308 is typically faster than to the secondary storage 1304. The secondary storage 1304, ROM 1306, and/or RAM 1308 may be non-transitory computer readable mediums and may not include transitory, propagating signals. Any one of the secondary storage 1304, ROM 1306, or RAM 1308 may be referred to as a memory, or these modules may be collectively referred to as a memory.

The transmitter/receiver 1310 may serve as an output and/or input device of the computer system 1300. For example, if the transmitter/receiver 1310 is acting as a transmitter, it may transmit data out of the computer system 1300. If the transmitter/receiver 1310 is acting as a receiver, it may receive data into the computer system 1300. The transmitter/receiver 1310 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 1310 may enable the processor 1302 to communicate with an Internet or one or more intranets. The I/O devices 1312 may include a video monitor, liquid crystal display (LCD), touch screen display, or other type of video display for displaying video, and may also include a video recording device for capturing video. The I/O devices 1312 may also include one or more keyboards, mice, or track balls, or other well-known input devices.

It is understood that by programming and/or loading executable instructions onto the computer system 1300, at least one of the processor 1302, the RAM 1308, and the ROM 1306 are changed, transforming the computer system 1300 in part into a particular machine or apparatus, e.g., a video codec, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

It should be understood that any processing of the present disclosure may be implemented by causing a processor (e.g., a general purpose CPU inside a computer system) in a computer system (e.g., the video encoder 1000 or decoder 1100) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc ROM (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A video codec configured to:
    obtain a current block and a plurality of neighboring pixels, wherein the current block comprises a first partition and a second partition, wherein the first partition comprises at least top-right, top-left, and bottom-left corner pixels of the current block, wherein the second partition comprises at least one pixel in a top row of the current block, and wherein one of two pixels, located at the middle of a bottom row of an upper neighboring block with respect to the current block, is selected as a reference pixel;
    select one or more reference pixels from the plurality of neighboring pixels; and
    predict a plurality of pixels located in the second partition based on the reference pixels.

2. The video codec of claim 1, further configured to determine whether to filter the reference pixels before predicting the pixels in the second partition, wherein the determination is based on at least one of an intra prediction mode of the current block and a size of the current block.

3. The video codec of claim 2, further configured to generate a filtered reference pixel by filtering the reference pixels when the size of the current block falls within a predefined range, wherein the filtered reference pixel is generated as a linear combination of a plurality of reference pixels across multiple rows or multiple columns, and wherein the plurality of pixels in the second partition are predicted using the filtered reference pixel.

4. The video codec of claim 2, further configured to generate a filtered reference pixel by filtering the reference pixels when an index of the intra prediction mode falls within a predefined range, wherein the filtered reference pixel is generated as a linear combination of a plurality of reference pixels, and wherein the plurality of pixels in the second partition are predicted using the filtered reference pixel.

5. The video codec of claim 2, further configured to insert a binary flag into a bitstream comprising encoded information of the current block, wherein the binary flag specifies whether the current block is filtered before intra prediction, and wherein the binary flag determines whether a corresponding decoder receiving the bitstream applies filtering during decoding of the current block.

6. An apparatus, used in video coding, comprising:
    a processor configured to:
        obtain a current block comprising a first partition and a second partition, wherein the first partition comprises at least top-right, top-left, and bottom-left corner samples of the current block;
        select a reference sample from an upper-right neighboring block of the current block and a lower-left neighboring block of the current block, wherein the reference sample is either a first sample located at a bottom-right corner of the lower-left neighboring block or a second sample located at a bottom-right corner of the upper-right neighboring block; and
        predict samples located in the second partition using the reference sample selected from the upper-right neighboring block and the lower-left neighboring block
    wherein the current block has a left neighboring block and an upper neighboring block, wherein a third sample is located at the top-right corner of the left neighboring block, wherein a fourth sample is located at the bottom-left corner of the upper neighboring block, and wherein selecting the reference sample comprises: computing a first absolute difference between the first sample and the third sample; and computing a second absolute difference between the second sample and the fourth sample.

7. The apparatus of claim 6, wherein the first absolute difference is greater than the second absolute difference, and wherein the first sample is selected as the reference sample because the first absolute difference is greater than the second absolute difference.

8. The apparatus of claim 6, wherein the first absolute difference is equal to or less than the second absolute difference, and wherein the second sample is selected as the reference sample because the first absolute difference is equal to or less than the second absolute difference.

9. A method of intra prediction in Three-Dimensional-High Efficiency Video Coding (3D-HEVC), the method comprising:
    obtaining a plurality of neighboring samples with respect to a current block, wherein the plurality of neighboring samples comprise a first sample located at a bottom-right corner of a lower-left neighboring block and a second sample located at a bottom-right corner of an upper-right neighboring block, wherein the plurality of neighboring samples are denoted as $p[x][y]$, with $x=-1$, $y=-1 \ldots nTbS*2-1$ and with $x=0 \ldots nTbS*2-1$, $y=-1$, wherein nTbS specifies a size of the current block, wherein the first and second samples are represented by $p[-1][nTbS*2-1]$ and $p[nTbS*2-1][-1]$, respectively;
    receiving a partition pattern that specifies a partitioning of the current block into partition 0 and partition 1, wherein the partition 0 comprises at least top-right, top-left, and bottom-left corner samples of the current block; and selecting one of the first sample and the second sample as a reference sample for intra predicting the partition 1, wherein the selection of the reference sample is based on a first absolute difference between samples p[−1][0] and p[−1][nTbS*2−1] and a second absolute difference between samples p[0][−1] and p[nTbS*2−1][−1].

10. The method of claim 9, wherein the first and second absolute differences are denoted as vertAbsDiff and horAbsDiff, respectively, and wherein the reference sample is used as a direct current (DC) mean value, denoted as dcValBR, calculated using operation:

$$dcValBR=(horAbsDiff>vertAbsDiff)?p[nTbS*2-1][-1]:p[-1][nTbS*2-1]). \quad (8)$$

11. The method of claim 10, wherein vertAbsDiff and horAbsDiff are calculated using operations:

$$vertAbsDiff=Abs(p[-1][0]-p[-1][nTbS*2-1]);\ and$$

$$horAbsDiff=Abs(p[0][-1]-p[nTbS*2-1][-1]).$$

12. The method of claim 10, wherein the partition pattern is a binary array comprising pattern values denoted as partitionPattern[x][y] with x, y=0 . . . nTbS−1, wherein the top-right, top-left, and bottom-left corner samples of the partition 0 are indicated by two binary variables, vertEdgeFlag and horEdgeFlag, both being equal to 0, and wherein vertEdgeFlag and horEdgeFlag are derived using the following operations:

$$vertEdgeFlag=(partitionPattern[0][0]!=partitionPattern[nTbS-1][0]),\ and$$

$$horEdgeFlag=(partitionPattern[0][0]!=partitionPattern[0][nTbS-1]).$$

13. The method of claim 10, further comprising intra predicting the partition 0 using a second DC mean value, denoted as dcValLT, calculated using operation:

$$dcValLT=(p[-1][0]+p[0][-1])>>1,$$

wherein, for x, y=0 . . . nTbS−1, intermediate variables predDcVal and dcOffset are defined and derived using the following operations:

$$predDcVal=(partitionPattern[x][y]==partitionPattern[0][0])?dcValLT:dcValBR,\ and$$

$$dcOffset=DcOffset[xTb][yTb][partitionPattern[x][y]],$$

wherein (xTb, yTb) specifies a top-left sample location of the current block relative to a top-left sample of a depth map that comprises the current block, and wherein predicted sample values of the current block, denoted as predSamples[x][y] with x, y=0 . . . nTbS−1, are derived based on predDcVal and dcOffset.

14. A video codec configured to:

obtain a current block and a plurality of neighboring pixels, wherein the current block comprises a first partition and a second partition, wherein the first partition comprises at least top-right, top-left, and bottom-left corner pixels of the current block, wherein the second partition comprises at least one pixel in a leftmost column of the current block, and wherein one of two pixels, located at the middle of a rightmost column of a left neighboring block with respect to the current block, is selected as a reference pixel;

select one or more reference pixels from the plurality of neighboring pixels; and predict a plurality of pixels located in the second partition based on the reference pixels.

* * * * *

UNITED STATES PATENT AND TRADEMARK OFFICE
CERTIFICATE OF CORRECTION

PATENT NO. : 10,129,542 B2
APPLICATION NO. : 14/515930
DATED : November 13, 2018
INVENTOR(S) : Zhouye Gu et al.

It is certified that error appears in the above-identified patent and that said Letters Patent is hereby corrected as shown below:

On the Title Page

(72) Inventors should read:
Zhouye Gu, Santa Clara, CA (US); Jianhua Zheng, Beijing (CN); Nam Ling, San Jose, CA (US); Chen-Xiong Zhang, Plano, TX (US)

In the Claims

Column 22, Lines 1-18, Claim 13. should read:
13. The method of claim 10, further comprising intra predicting the partition 0 using a second DC mean value, denoted as dcValLT, calculated using operation:
  dcValLT = (p[−1][0] + p[0][−1]) >> 1, wherein, for x, y=0..nTbS − 1, intermediate variables predDcVal and dcOffset are defined and derived using the following operations:
   predDcVal = (partitionPattern[x][y] = = partitionPattern[0][0])?dcValLT: dcValBR, and dcOffset = DcOffset[xTb][yTb][partitionPattern[x][y]], wherein (xTb, yTb) specifies a top-left sample location of the current block relative to a top-left sample of a depth map that comprises the current block, and wherein predicted sample values of the current block, denoted as predSamples[x][y] with x, y =0..nTbS − 1, are derived based on predDcVal and dcOffset.

Signed and Sealed this
Twenty-second Day of January, 2019

Andrei Iancu
*Director of the United States Patent and Trademark Office*